United States Patent [19]

Faber et al.

[11] Patent Number: 4,504,936
[45] Date of Patent: Mar. 12, 1985

[54] MODULAR DATA STORAGE SYSTEM

[75] Inventors: Johannes W. Faber; Jacobus A. deVos, both of Eindhoven, Netherlands

[73] Assignee: U.S. Philips Corporation, New York, N.Y.

[21] Appl. No.: 298,843

[22] Filed: Sep. 3, 1981

[30] Foreign Application Priority Data

May 21, 1981 [NL] Netherlands ............... 8102495

[51] Int. Cl.³ ............... G11B 17/00; G11B 5/48
[52] U.S. Cl. ............... 369/34; 360/98; 369/36; 369/39
[58] Field of Search ............... 369/34, 30, 32, 33, 369/36, 38, 39; 360/97, 98, 86

[56] References Cited

U.S. PATENT DOCUMENTS

| | | | |
|---|---|---|---|
| 3,267,591 | 8/1966 | Locke et al. | 369/34 |
| 3,288,024 | 11/1966 | Cronquist et al. | 353/26 R |
| 4,127,882 | 11/1978 | Kohl et al. | 360/98 |
| 4,170,031 | 10/1979 | Beuch et al. | 360/98 |
| 4,271,489 | 6/1981 | Siryj et al. | 360/98 |
| 4,273,342 | 6/1981 | Gilson et al. | 369/32 |

OTHER PUBLICATIONS deVos, J. A., Megadoc, a Modular System for Electronic Document Handling, Philips, vol. 39, No. 12, 1980.

Primary Examiner—Steven L. Stephan
Attorney, Agent, or Firm—Joseph P. Abate

[57] ABSTRACT

A modular data storage system for a plurality of identical data carriers (3) includes at least one recorder apparatus and at least one storage module (10). The storage module includes an internal transport device (32). An external transport device (13) is associated with the outside of the storage module, which external transport device can transport data carriers between the recorder apparatus and the storage module.

The recorder apparatus includes a recorder module (9) comprising a module frame having outer dimensions which are substantially equal to those of a module frame of the storage module so that all of these modules can be arranged successively adjacent to form optional configurations adapted to suit specific requirements. The external transport device (13) cooperates with the recorder and storage modules at their backs and is located inside a cabinet (5, 6, 8, 13) of the modular data storage system.

7 Claims, 18 Drawing Figures

MODULAR DATA STORAGE SYSTEM

BACKGROUND OF THE INVENTION

The invention relates to a modular data storage system comprising: a plurality of identical data carriers having a recording layer in which data can be recorded in coded form and from which said data can be read; at least one recorder apparatus provided with supporting means for supporting a data carrier in a recorder operating position and provided with recording and/or read means for recording and/or reading the data on or from a data carrier which is in the recorder operating position; at least one storage module for storing a plurality of said data carriers close to and adjacent each other, which storage module comprises a module frame; an internal transport device accommodated within the module frame of the storage module for the transport of data carriers between a storage position and a transfer position at the back of the storage module; an external transport device, cooperatively associated with the storage module at the storage module back, for the transport of data carriers between said transfer position at the back of the storage module and a loading position near a recorder apparatus; an enclosure for the external transport device located at the back of the storage module; and at least one electronic control unit, associated with the storage module, for coordinating and controlling the transport of the data carriers between their storage positions in the storage module and the loading position near the recorder apparatus; the storage modules, when the storage system comprises a plurality of such modules, being arrangeable on top of and adjacent each other in optional configurations to form enclosed modular systems with a data-storage capacity adapted to specific requirements, the external transport device cooperating with each storage module at the rear and the enclosure of the external transport device being adapted to the resulting external dimensions of said configuration of combined storage modules.

Such a modular data storage device for the storage of computer data is known from U.S. Pat. No. 3,715,040. The data carriers comprise magnetic-tape reels provided with an amount of magnetic tape and the recorder apparatus comprises a professional magnetic-tape recorder suitable for the purpose. The magnetic-tape recorder is of the type frequently employed in peripheral equipment used in conjunction with larger computer systems. The recorder comprises two reel spindles, permitting transport of a magnetic tape from a reel on the one reel spindle to another reel on the other reel spindle. A full magnetic-tape reel is manually placed onto the one reel spindle, after which the magnetic tape is fed to the reel on the second reel spindle via a plurality of tape guides and magnetic heads and is attached to said second reel. Subsequently, the recorder may be put into operation for reading the data on the magnetic tape or for recording data on the magnetic tape. After use, the magnetic tape is rewound onto the first reel and the reel containing the tape is removed from the magnetic-tape recorder and may then be stored for subsequent use.

In this known data storage system, the external transport device comprises two sections. A first section of the external transport device is located at the back of a plurality of stacked storage modules. Data carriers, specifically, magnetic tape reels comprising reels with magnetic tapes wound thereon, are moved into an upper position in a vertical direction along the backs of the storage modules. There the magnetic tape reel is taken over by a horizontal section of the external transport device, which actuates a plurality of vertical sections of the external transport device and which can bring a magnetic-tape reel into the loading position near a recorder. Said horizontal section is only suitable for bringing magnetic-tape reels into a loading position near a single recorder apparatus. The magnetic tape reels are moved to a position above the recorder apparatus where they can be removed from the horizontal section of the external transport device by an operator. Subsequently, the magnetic tape reel is manually placed onto the recorder apparatus. When a magnetic tape reel is removed from the recorder by an operator it may be placed back in the loading position on the horizontal section of the external transport device. Since the transport devices transfer the magnetic-tape reels to a location near the recorder, this causes the operator a certain amount of work. However, the magnetic-tape reels still have to be handled manually by an operator, so that only the location of the storage position of the relevant magnetic-tape reel and the transport of said reel between the storage module and the recorder are effected automatically under control of the control unit. The external transport device appears to be unsuitable for cooperation with a plurality of magnetic-tape recorders, unless intricate further steps, which are not revealed in said U.S. Patent are taken, such as adding branches to the horizontal section of the external transport device, complete with shunts and an intricate control system.

SUMMARY OF THE INVENTION

It is an object of the present invention to provide a modular data storage system of the type mentioned in the opening paragraph, permitting the recorder apparatus to be remote-controlled without the intervention of an operator and permitting the use of a plurality of recorders.

To this end, the invention is characterized in that: the recorder apparatus includes a recorder module having a module frame whose outer dimensions are substantially equal (e.g. standard) to those of the storage module so that, when the system includes a recorder module and a plurality of storage modules, the recorder module and the storage modules can be arranged successively adjacent in optional configurations to suit specific requirements; that said loading position of the data carriers is disposed at the back of the recorder module; that the external transport device cooperates with the backs of the storage and recorder modules; that the enclosure of the external transport device is adapted to the resulting external dimensions of said configuration of storage and recorder modules; and that the recorder module comprises an internal transport device, disposed within the recorder module frame, for the transport of a data carrier between said loading position at the back of the recorder module and said recorder operating position inside the recorder module.

Thus, in a modular data storage system in accordance with the invention, the recorder modules do not constitute separate self-contained devices. They are combined with the storage modules to form an integrated configuration of associated modules. As a result of this, a data carrier need only be moved over a minimal distance by the external transport device. The external transport device has access to all modules at the back, so that, for example, an external transport device as known from said U.S. Pat. No. 3,715,040 may be used for the transport of data carriers between all storage modules and all recorder modules. In said known data storage system, the horizontal section of the external transport device cooperates with all vertical sections. Since no data carriers need to be handled by an operator, the modular data storage system may be fully enclosed, thereby providing an optimum protection against environmental influences. The internal transport devices of the recorder modules automatically transfer the data carriers, delivered by the external transport device, to the supporting means and place the data carrier in the recorder operating position. Since this involves no operator activities, the data storage system may be remote-controlled.

In principle, the data storage system in accordance with the invention may be located at an arbitrary distance from the other devices cooperating with the system. These may, for example, be devices which supply input data to the data storage system for storage therein or devices which receive output data from the data storage system, such as document readers and display terminals, respectively.

If the data carriers, as in said U.S. Pat. No. 3,715,040, comprise magnetic tape reels, a recorder apparatus should comprise means for automatically passing the magnetic tape from the one reel via the guide means and the magnetic heads to the other reel and attaching said tape to the last-mentioned reel. Recorders capable of this are known. The free end of the magnetic tape on the magnetic-tape reel is provided with a more or less rigid portion, so that automatic threading of the magnetic tape is possible by means of a mechanism which cooperates with the more or less rigid portion. Alternatively, magnetic tape cartridges may be used, which are easier to load.

A known disadvantage of a magnetic tape for recording and storage of data is that specific data which are located somewhere on the magnetic tape are only accessible for read-out after transport of a specific amount of magnetic tape along the magnetic heads. This is because the data are recorded on the tape in sequential tracks and only a small portion of the magnetic tape in the direct vicinity of the magnetic heads is directly accessible for read-out. Data carriers providing faster access to the data stored on them are, for example, the well-known magnetic discs or optical discs. The discs are rotated and the tracks on the discs are arranged in the form of concentric circles or of a spiral. By rapidly moving a suitable head over the surface of the rotating disc, all the data on the disc are rapidly accessible. Such discs may be used in conjunction with a modular data storage system in accordance with the invention. When discs are used, the recorder modules, with their internal transport devices, may bear some resemblance to the known so-called jukebox equipment in which phonograph records are automatically placed onto and removed from a turntable. Also, in the field of computer peripherals, recorder equipment is known in which a transport device automatically transfers a recording disc, which may be accommodated in an enclosure or cassette, between a loading position and a recorder operating position; see, for example, U.S. Pat. No. 4,170,030. In the apparatus known from said Patent, the data carriers comprise flexible magnetic discs accommodated in an enclosure. Another example in which the data carriers comprise optical discs is described in the article "An Optical Disc Replaces 25 Magnetic Tapes," *IEEE Spectrum,* February 1979, pages 33–38, by G. C. Kenney et al.

Preferably, an embodiment of the invention is used which is characterized in that further units which also belong to the system, such as said electronic control unit, a power supply unit etc., comprise control modules, power-supply modules etc., each having a module frame, which modules may all be arranged successively adjacent in a specific configuration so as to form a modular system.

This embodiment provides a highly modular system having a high degree of "intelligence," that is many of the control processes required can be performed within the data storage system itself. The system only requires simple commands for automatically performing the operations necessary to obtain the desired result.

The highly modular construction has the advantages that very flexible arrangements can be obtained, that defective or incorrectly functioning units can rapidly be replaced and that it is possible to employ standard dimensions and, thus, a large amount of standard components. In this respect, a further embodiment of the invention is of interest which is characterized in that the modules are arranged in a mounting rack, that the module frame of each module is movable relative to the rack by means of a guiding device, and that by means of the guiding device each of the movable module frames is movable between an operating position inside the rack and a maintenance position at least partly outside the rack.

This embodiment provides a rapid access to all modules at the front of the data storage system. In addition, it is possible to employ such a control that it is possible to work on a module without disturbing the operation of the remainder of the system. The external transport device can be made to be readily accessible from the back by means of doors in the enclosure, so that repairs to the external transport device, replacement of parts, or testing are possible in a convenient and rapid manner.

Since, in general, the data storage system in accordance with the invention will be fully enclosed, while permitting manual insertion or removal of record carriers into or from the system, a further embodiment of the invention is of interest which is characterized in that, in a front wall of at least one storage module, a port is formed, which port is adapted to the external dimensions of a data carrier, for manually inserting or removing a data carrier into or from the storage module; that, in the storage module, there are provided signalling means for signalling the presence of a data carrier in the port; and that, by means of the internal transport device, the data carriers are movable in the storage module between the storage position and a transfer position in the port at the front of the storage module.

In this embodiment of the invention, the internal transport device of the storage module has a double function, namely, the transport of data carriers between the storage position and the transfer position at the rear of the module and the transport of data carriers between the storage position and the transfer position at the front of the storage module. The presence of the signalling means permits the transport between the storage position and the transfer position at the front of the storage module to be controlled by the control unit. The signalling means may also serve to ascertain whether a data carrier is located in the correct position in the port at the front of the storage module. In order to mitigate the drawback of having an opening in the front wall of the storage module, an advantageous embodiment of the invention is characterized in that the port in the front wall of the storage module can be blocked by means of movable blocking elements. Data carriers inserted through the port in front of one of the storage modules may subsequently be transported to other storage modules by the relative internal transport device in cooperation with the external transport device at the rear.

In the data storage system known from said U.S. Pat. No. 3,715,040, the data carriers are arranged vertically in the storage position in a storage rack in a storage module, namely, parallel to the front wall thereof. Each storage module has an internal width which is greater than twice the width of the data carrier, so that adjacent the storage rack an internal transport space is formed having a width greater than the width of a data carrier. The internal transport device of the storage module comprises a sliding device for sliding a data carrier parallel to the front wall of the storage module into and out of the storage rack, between the storage position and a slid-out position within the transport space. Said internal transport device comprises a gripping device for gripping the data carrier in the transport space and, furthermore, comprises a translation device in order to move a gripped data carrier in the depth direction of the storage module between the slid-out position and a transfer position. An embodiment of the invention which also has said characteristic features of the known data storage device is further characterized in that the data carriers comprise discs having a first recording layer on a first side and a second recorder layer on a second side and that said internal transport device comprises a tilting device which is pivotable in two directions (i.e. bi-directional) for tilting a disc in the transport space through 90° in a first direction or through 90° in an opposite second direction, in order to transfer the disc in the transfer position in a first or in a second tilted orientation.

This embodiment of the invention is found to be eminently suitable for the use of data carriers in the form of optical discs accommodated in enclosures; the assembly comprising the disc and enclosure constituting a cassette. The optical discs may have a recording layer on each side, so that it may be necessary to be able to arrange them on a recorder apparatus in two different positions.

If said translation device in the storage module comprises an internal carriage, an embodiment is of interest which is characterized in that: the tilting device is located on the internal carriage and tilts the data carrier into a horizontal position; that, on said carriage, a substantially L-shaped sensing arm is arranged, having a first limb connected to said carriage, which limb extends horizontally in the direction of translation of said carriage towards the front of the storage module and has an end which is remote from said carriage, and having a second limb connected to said end, which second limb extends transversely of the first limb; and that the second limb carries signalling elements for signalling the correct horizontal position of a data carrier.

The tilting device already positions the cassette in a horizontal position in the storage module. Subsequently, further transport of the cassette may be effected in its horizontal position and the cassette may be also horizontally brought to the recorder operating position. In the recorder module, the optical disc may be driven by means of a vertical spindle and the data may be recorded on or read from the optical disc by means of an optical pick-up via a slot in the wall of the cassette.

The transport of the cassettes in a horizontal position has a number of distinct advantages. The optical discs may comprise two glass plates having a diameter of approximately 30 cm, so that the cassette may have a relatively large mass, namely, approximately 1 kg. It is therefore useful to support the cassettes over a comparatively large area during transport. Accordingly, the horizontal position is favorable. For a correctly operating recorder module, it is also advantageous if the optical disc is rotated about a vertical axis, because the load exerted on the drive spindle by the weight then acts in the direction of the axis of rotation. Since the axis of rotation and the force of gravity act in the same direction, it is easier to achieve automatic alignment of the center of the optical disc relative to the axis of rotation of the drive spindle.

In combination with the last-mentioned embodiment, when a port is disposed at the front of the storage module, a further embodiment of the invention is of interest which is characterized in that: on said internal carriage there is provided a second substantially L-shaped sensing arm which comprises a first limb connected to the carriage, which limb extends horizontally in the direction of translation of the carriage towards the rear of the storage module and which has an end which is remote from the carriage, and a second limb, connected to said end, which second limb extends transversely of the first limb; that the second limb carries signalling means for signalling the correct horizontal position of a data carrier; that, of each of the substantially L-shaped sensing arms, at least a portion of the first limb, which portion is situated nearer the second limb, is pivotable between a sensing position and a pivoted position in which position a data carrier can be moved horizontally without being impeded by the sensing arm; and that, near the front of the storage module, there is disposed a front run-on cam and, at the rear of the storage module, a rear run-on cam, which, during the movement of the carriage of the storage module to the front or to the rear respectively, cooperate with the pivotal portion of the substantially L-shaped sensing arm which faces the relevant side in order to move said arm from the sensing position to the pivoted position.

When the modular data storage system in accordance with the invention, similarly to the system in said U.S. Pat. No. 3,715,040, is equipped with an external transport device comprising a vertical guiding device at the rear of a plurality of stacked modules and further comprising a changer which is vertically movable along the guiding device for changing the data carriers and which is provided with a retaining device for a data carrier, it may be advantageous to use an embodiment of the invention which is characterized in that, in the case of a configuration which includes a plurality of modules arranged successively laterally adjacent, the external transport device comprises a horizontal guiding device at the rear of the configuration of modules, and that the entire vertical guiding device is horizontally movable along the horizontal guiding device so that the changer is both horizontally and vertically movable along the back of the configuration of modules.

In said embodiment of a modular data storage system, the changer of the external transport device is movable in both the vertical and the horizontal directions, as the case may be, simultaneously. In comparison with said known modular data storage system, an advantage of the presence of such an external transport device is that the data carriers need not be transferred between various sections of the external transport device. Only a single changer is employed in which the data carrier stays during the transport by the external transport device. This eliminates a technical complication while, moreover, a faster transport of the data carrier along the backs of the modules is possible because superfluous movements may be avoided.

An embodiment of the invention, in which the external transport device comprises a changer which is movable along the back of a plurality of modules and which has a retaining device for a data carrier, is characterized in that the changer is provided with two retaining devices for two data carriers in order to enable two data carriers to be interchanged at the back of a module. This embodiment of the invention has the important advantage that the transport of data carriers by the external transport device is roughly twice as fast as in the case of the single retaining device for only one data carrier, without the need to increase the speeds with which the changer is moved in the vertical and the horizontal directions.

When this embodiment is used, the control system for the changer is adapted accordingly. During the time that a data carrier is located in the recorder operating position on a recorder module, the control device directs the changer to a storage module, for the storage of the data carrier in said module, and subsequently to a storage module in order to collect another data carrier, which data carrier is subsequently transported to the back of the recorder module. The data carrier which is located on a recorder module and which is to be replaced by the next data carrier can be moved from the recorder operating position in the transfer position by the internal transport device of the recorder module, after which it is taken over by the first retaining device of the changer. Said changer moves over a small distance and the data carrier just collected is transferred to the recorder module in the reverse sequence. The changer returns the data carrier just received to its storage module and another data carrier is fetched from a storage module and transported to the recorder module.

An embodiment of the invention in which the data carriers are formed by cassettes comprising a flat box-shaped enclosure accommodating a single optical disc which can be inscribed and read on two sides will now be described in more detail with reference to the accompanying drawing.

DESCRIPTION OF THE PREFERRED EMBODIMENTS

The various details of the modular data storage system are not drawn to the same scale in all the Figures, but to a scale which most clearly illustrates the details to be described.

Figure 9:
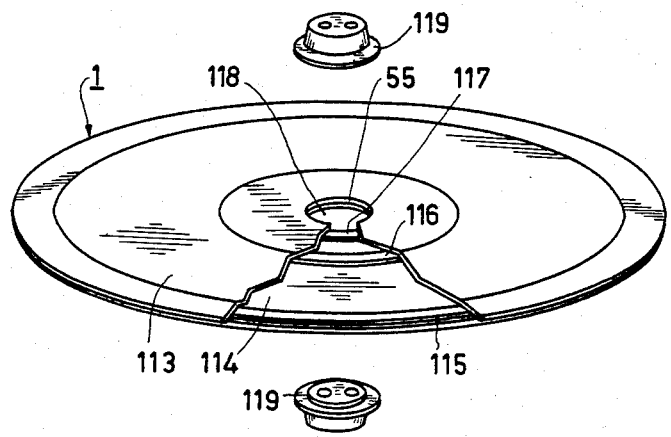
FIG. 9 is a partly cut-away perspective view of an optical disc.
Figure 10:
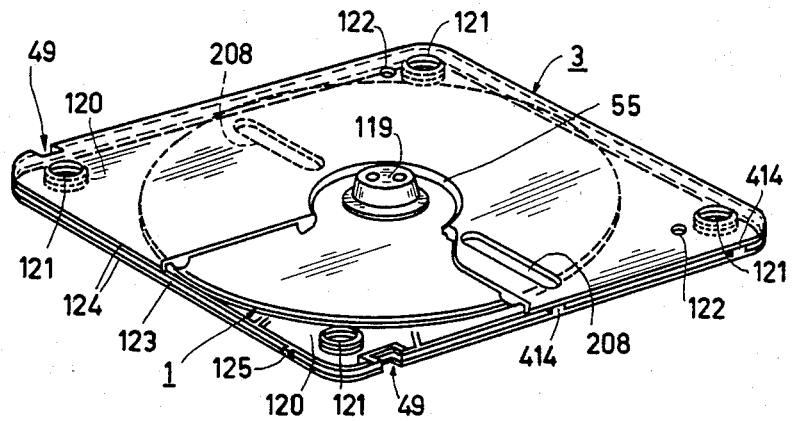
FIG. 10 is a partly cut-away perspective view of an optical-disc cassette in accordance with FIG. 1, which cassette constitutes a standard data carrier for a data storage device in accordance with the invention.

The modular data storage system comprises a plurality of identical data carriers in the form of cassettes 3 with optical discs 1 (see FIGS. 9 and 10 and the part of the description under the heading "The cassette").

Figure 3:
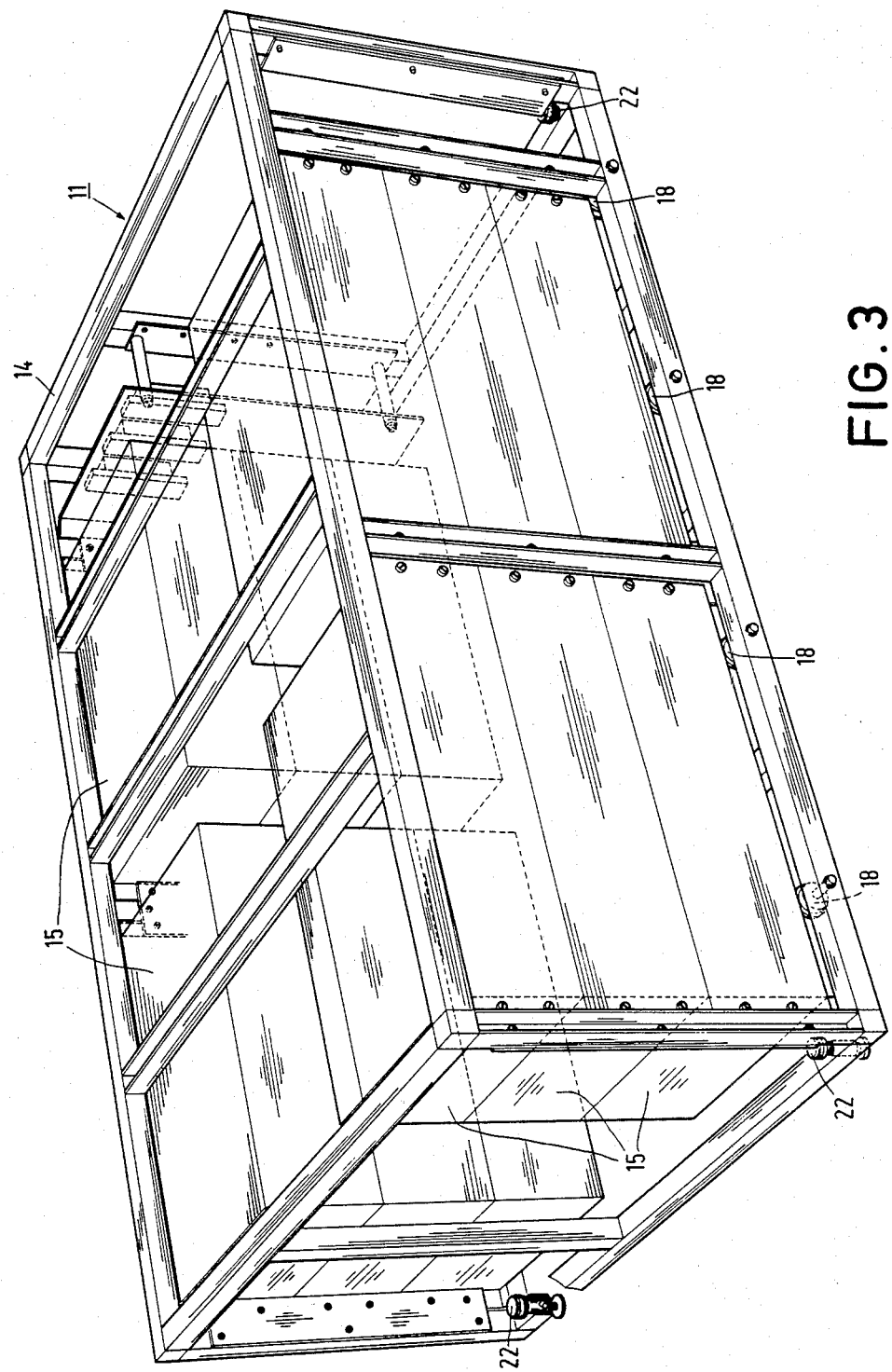
FIG. 3 is a perspective view of a control module.
Figure 8:
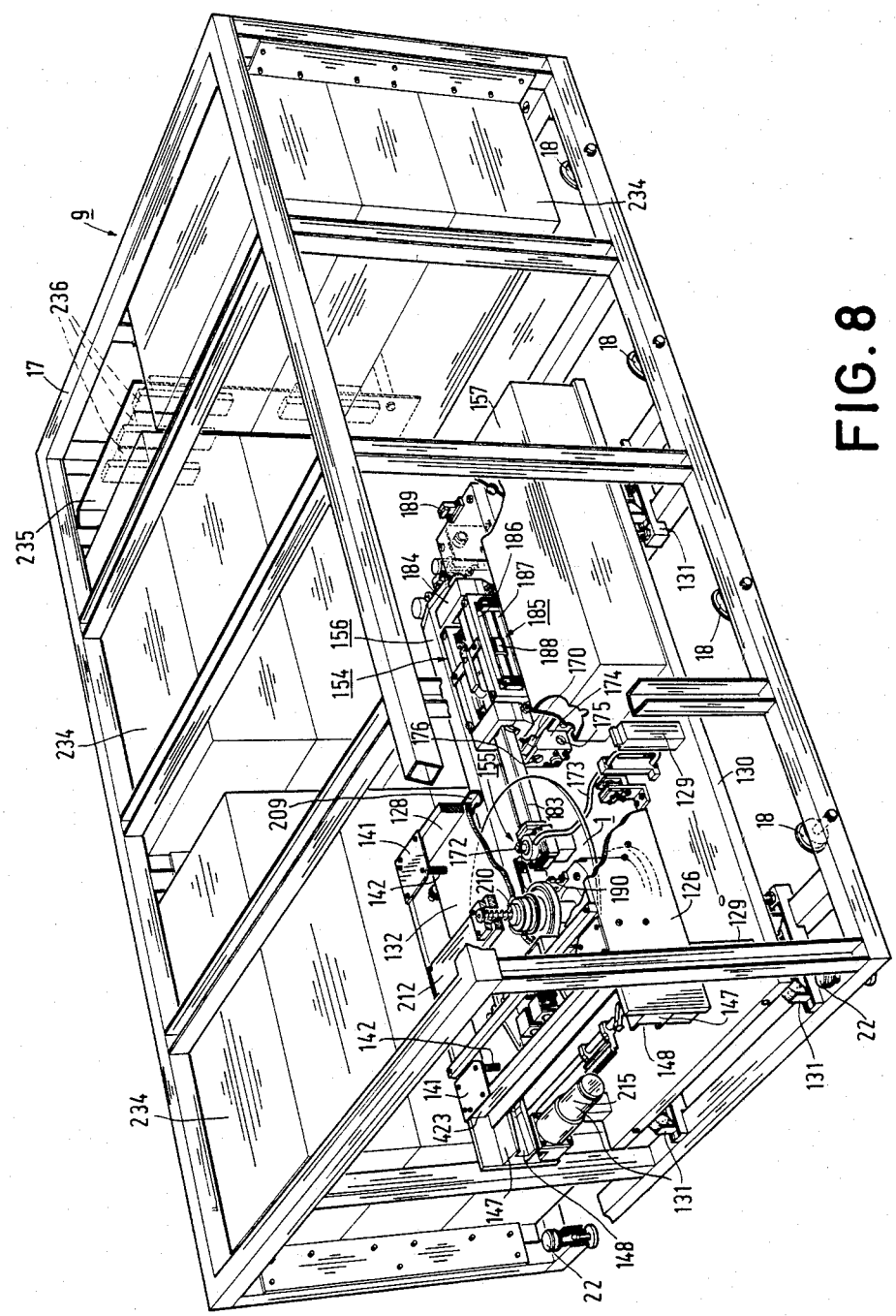
FIG. 8 is a perspective view of a recorder module, some parts being cut away for the sake of clarity.

The data storage system comprises a mounting rack 4 made of metal sections, which rack is closed at the top by cover plates 5. On each of the sides, two side plates 6 and 7 and a rear side-door 8 are disposed. Each rack 4 can accommodate three modules arranged above each other. The modules may comprise recorder modules 9 (see FIG. 8), storage modules 10 (see FIG. 4), control modules 11 (see FIG. 3) and any further kinds of modules.

At the front, each mounting rack 4 is closed by two front doors 12A of different widths. The wider door covers the access openings of the storage modules, so that the narrower door can remain closed when manually inserting or removing a cassette. Rear doors 12B are provided at the rear. The data storage system is thus entirely closed. Satisfactory accessibility is obtained by the use of doors. Inside the enclosure at the back of the modules, an external transport device 13 is arranged for the transport of cassettes between the modules. The storage modules 10 and the recorder modules 9 are each provided with internal transport devices which will be described in more detail hereinafter.

The transport of cassettes 3 between storage modules and recorder modules is coordinated and controlled by means of inter alia the electronic control unit 11. The storage modules, recorder modules, control modules and any further modules may be arranged successively adjacent in any desired configuration to form modular systems with a data storage capacity adapted to specific needs. In the embodiment shown, the system may be extended at option with mounting racks 4, cover plates, side plates and doors in order to form a modular data storage system of suitable capacity. The external transport device 13 is adapted to the number of mounting racks used and cooperates with all storage modules and recorder modules at the back. The data storage system is approximately 1.70 m high and 1.62 m deep. The width of a single mounting rack 4 is approximately 0.90 m.

The data storage system shown may, for example, be used as an electronic file for the storage of documents in coded form. In the case of A4-format documents, a resolution of 8 lines per mm in the horizontal direction and 7.7 lines in the vertical direction is required in accordance with the standards for high-quality facsimile reproduction. This means that, per A4-size page, a maximum of 500 kbytes of binary information is necessary. This amount of information per page permits a high-quality reproduction of text, graphs and drawings. Each optical disc has a storage capacity of approximately 25,000 pages A4 using a data compression method, which means a capacity of $1.5 \times 10^6$ pages per storage module. If exclusively printed text is to be stored, the alphanumeric data of each document being coded by means of codes such as for example the ASCII-code, a capacity of substantially twenty times as high is attainable.

Each of the modules comprises a module frame. The module frame 14 of the control module 11 (FIG. 3) comprises a plurality of suitably interconnected sections. These parts and the manner in which they are interconnected will not be described in more detail because this is evident from the drawing. In the module frame 14 of the control module 11, a plurality of metal bins 15 is arranged in accordance with the 19-inch standard. These bins contain electronic circuits for controlling the data storage system. The storage module 10 has a similar module frame 16 and the recorder module 9 a similar module frame 17. If desired, further modules which are required, such as a power-supply module, may be equipped with a similar module frame of the same dimensions.

Figure 1:
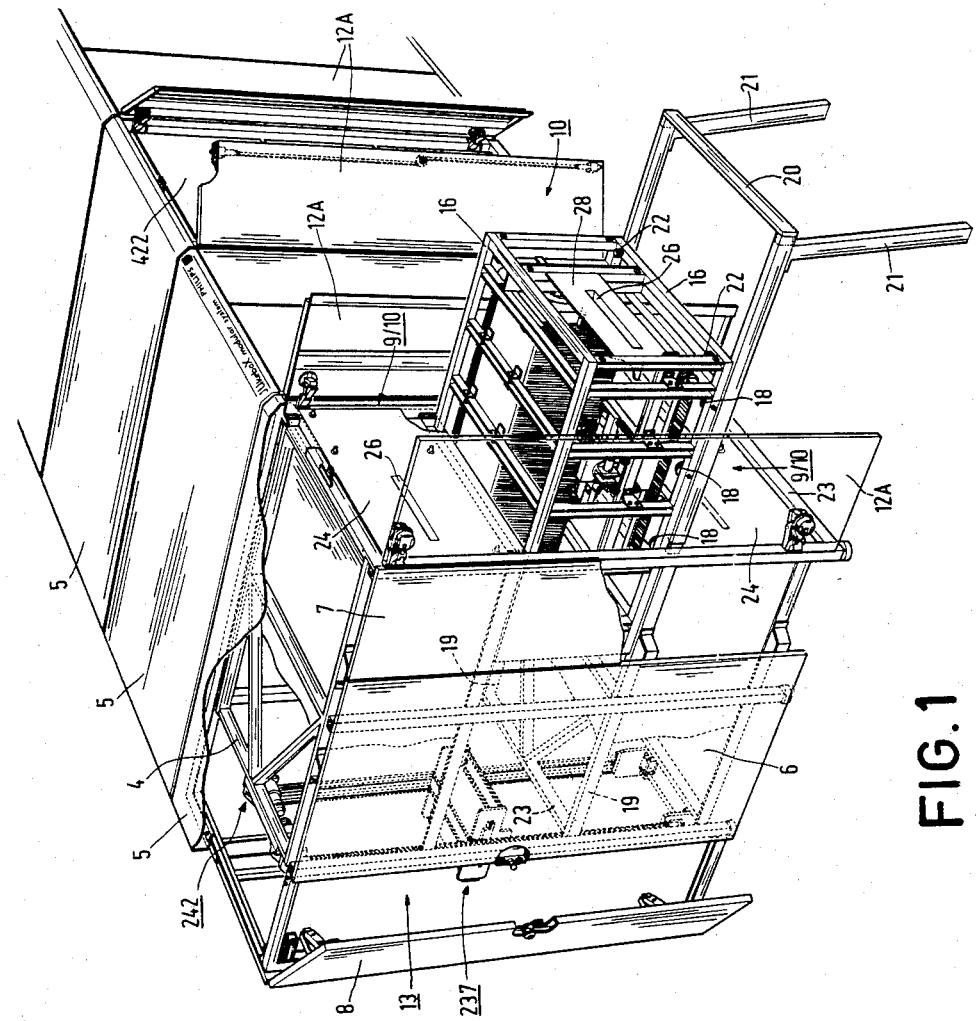
FIG. 1 is a perspective front view of a modular data storage system in accordance with the invention, comprising a plurality of storage modules, one of which, for maintenance purposes, has been moved outwards over a certain distance, each storage module containing sixty-four optical-disc cassettes.

All modules are arranged in a rack 4 and are provided with four wheels 18 at the bottom on both sides. In the mounting rack, the wheels 18 bear on the guides 19. The wheels 18 and the guides 19, together, constitute guiding devices for the modules. Such guiding devices enable the modules to be moved between an operating position within the rack 4 and a maintenance position. See FIG. 1 in which a storage module 10 is shown partly outside the rack 4. In view of the dimensions and the weight of the storage module, use is made of a special maintenance frame 20 which is coupled to the mounting rack 4 and which comprises legs 21 which may be replaced by legs of different length. In order to enable the modules to be fixed firmly and without play in their operating positions in the mounting racks, all modules are provided with manually adjustable studs 22 which, in the tightened condition, bear on cross members 23 of the mounting rack.

The cassette

The optical disc 1 comprises two glass discs 113 and 114 which, by means of three concentric ring-shaped spacers 115, 116, 117, are combined to form a unit. Such an optical storage disc is described in U.S. Pat. No. 4,074,282 (herewith incorporated by reference).

In the space between the spacers 115 and 116, the glass discs 113 and 114 are provided with a vacuum-deposited metal layer on their confronting surfaces. By means of a laser beam, local pits can be melted into said layer. This results in areas of different light reflecting properties in the metal layer. The reflected light beam is modulated by the pattern of pits in the radiation-sensitive metal layer. By suitable opto-electronic means, said modulation is converted into an electrical modulation, so that the pattern of pits in the metal layer is converted into bit patterns suitable for digital processing. The optical disc 1 has a central hole 118 in which centering caps 119 are arranged on both sides, which caps serve for centering the optical disc on the recorder.

The cassette 3 (see FIG. 10) has already been described in the applicant's previous U.S. patent application No. 146,902 (herewith incorporated by reference). The cassette mainly comprises the optical disc 1 and an enclosure constituted by two covers 120 of square shape. At the corners, the covers 120 are interconnected by elastic connecting members 121 which urge the covers 120 towards each other. In the narrow side of the cassette housing, two recesses 49 are formed for cooperation with a sliding cam 39 of the internal transport device 32 of the storage module.

Furthermore, the cassette housing has two openings 122 which make it possible to carry out an optical check whether the cassettes are in the correct position in the storage rack of the storage module.

The cassette has a circumferential slot 123 bounded by ridges 124 of the covers 120. The ridges are locally provided with a projection in the form of a cam 125, which serves to prevent incorrect insertion of a cassette into the recorder module, and cams 414 for latching the cassette in a slot 392 in the rack plate 31 of the storage module. Slots 208 in the covers 120 allow the passage of a laser beam to the optical disc.

The storage module

For protection against dust and other contaminations, the storage modules are covered by a front wall 24 and a rear wall 25 at the front and the back, respectively, which walls are detachably arranged on the mounting rack 4. Said front walls and rear walls have ports 26 and 27 adapted to the external dimensions of the cassettes 3. The port 26 in the front serves for the manual insertion or removal of a cassette 3. Behind the front wall 24, a second front wall 28 is secured to the module frame 16, which second front wall normally remains in place during maintenance activities. The port 26 continues in the front wall 28. At the rear of the storage module, a second rear wall 29 is located in which the port 27 continues.

Inside the module frame 16, a storage rack for the cassettes 3 is arranged. Said rack comprises an upper slotted rack plate 30 and a lower slotted rack plate 31. In the storage position, the cassettes 3 are vertically arranged in said storage rack, parallel to the front wall 24. The internal width of the storage module 10 is greater than twice the width of a cassette 3, so that adjacent the storage rack an internal transport space is available having a width greater than the width of a cassette 3. In said transport space, an internal transport device 32 is movable. Said device substantially comprises three units, namely, a sliding device 33, a gripping device 34, and a translation device 35. The sliding device 33 is intended for sliding a cassette 3 parallel to the front wall 24 into and out of the storage rack between the storage position (shown in FIG. 4) and a slid-out position in the transport space. The gripping device 34 grips the cassette 3 in the transport space. The translation device 35 transfers the gripped cassette in the depth direction of the storage module between the slid-out position and a transfer position at the front or at the rear of the storage module. In a transfer position, the cassette is located partly in the slot 26 at the front or in the slot 27 at the back.

The internal transport device 32 comprises a carriage 36, to which a transversely extending member 37 of the sliding device 33 is rigidly secured, and the gripping device 34. At its top, the member 37 has a groove 38 in which a sliding cam 39 is movable. Said cam is driven by a toothed belt 40 which is passed over a guide roller 41 on the one side and a drive roller 42 on the other side. The drive roller is driven by a motor 43, which drives the drive roller via two bevel gears 44 and 45, a shaft 46 and a slipping clutch 47 with a compression spring 48. The motor 43 incorporates a tachogenerator and a Gray-code shaft-position indicator. The cassettes 3 are formed with a recess 49 in which the sliding cam 39 engages. By means of the sliding cam 39, a cassette 3 can be drawn out of the storage rack from the storage position into a slid-out position. The last-mentioned position is not shown in the drawing. In order to provide some lateral guidance for the cassettes 3, lateral guide cams 50 are secured to the member.

Figure 4:
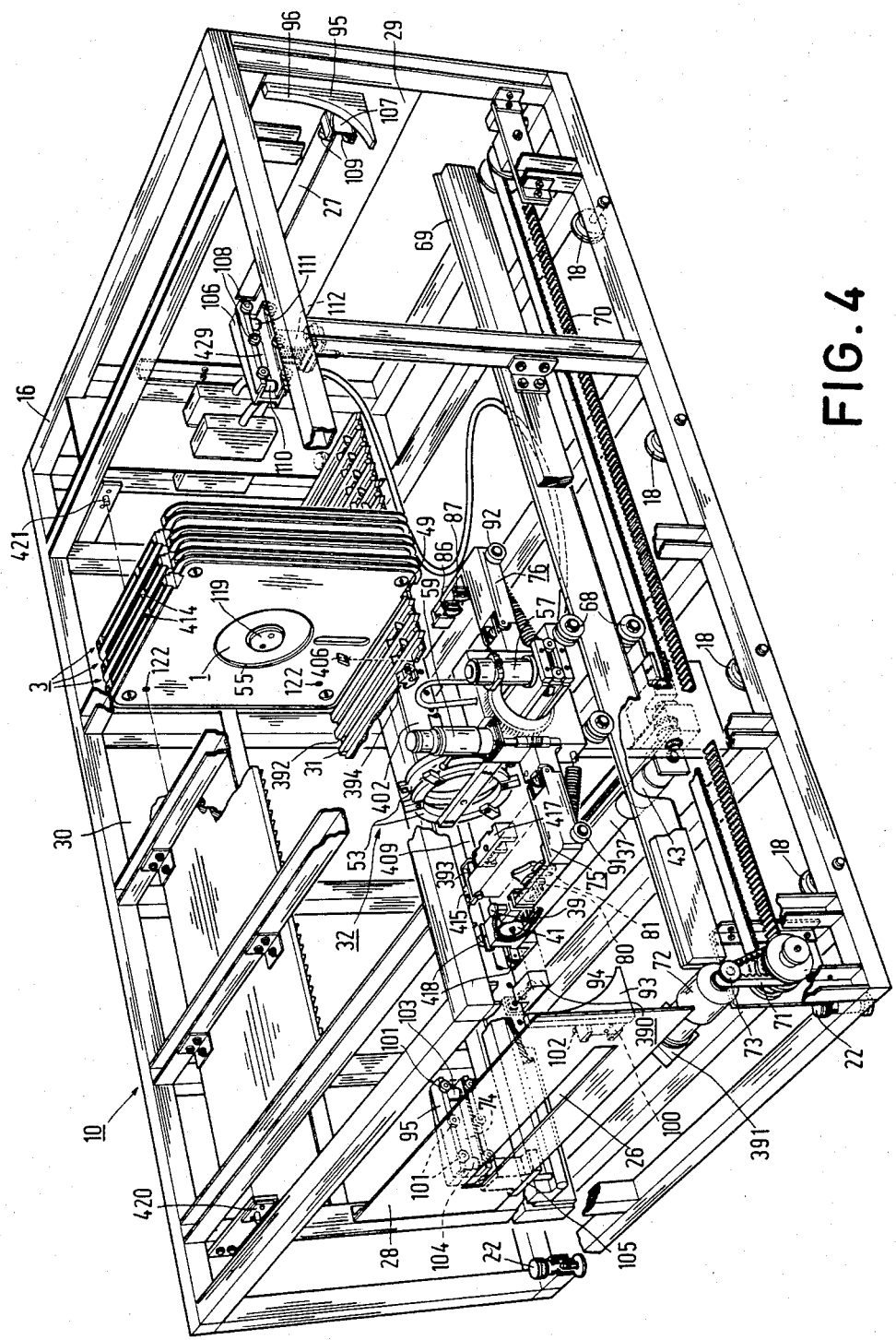
FIG. 4 is a perspective view of a storage module, some parts of the storage module being cut-away for the sake of clarity.
Figure 5:
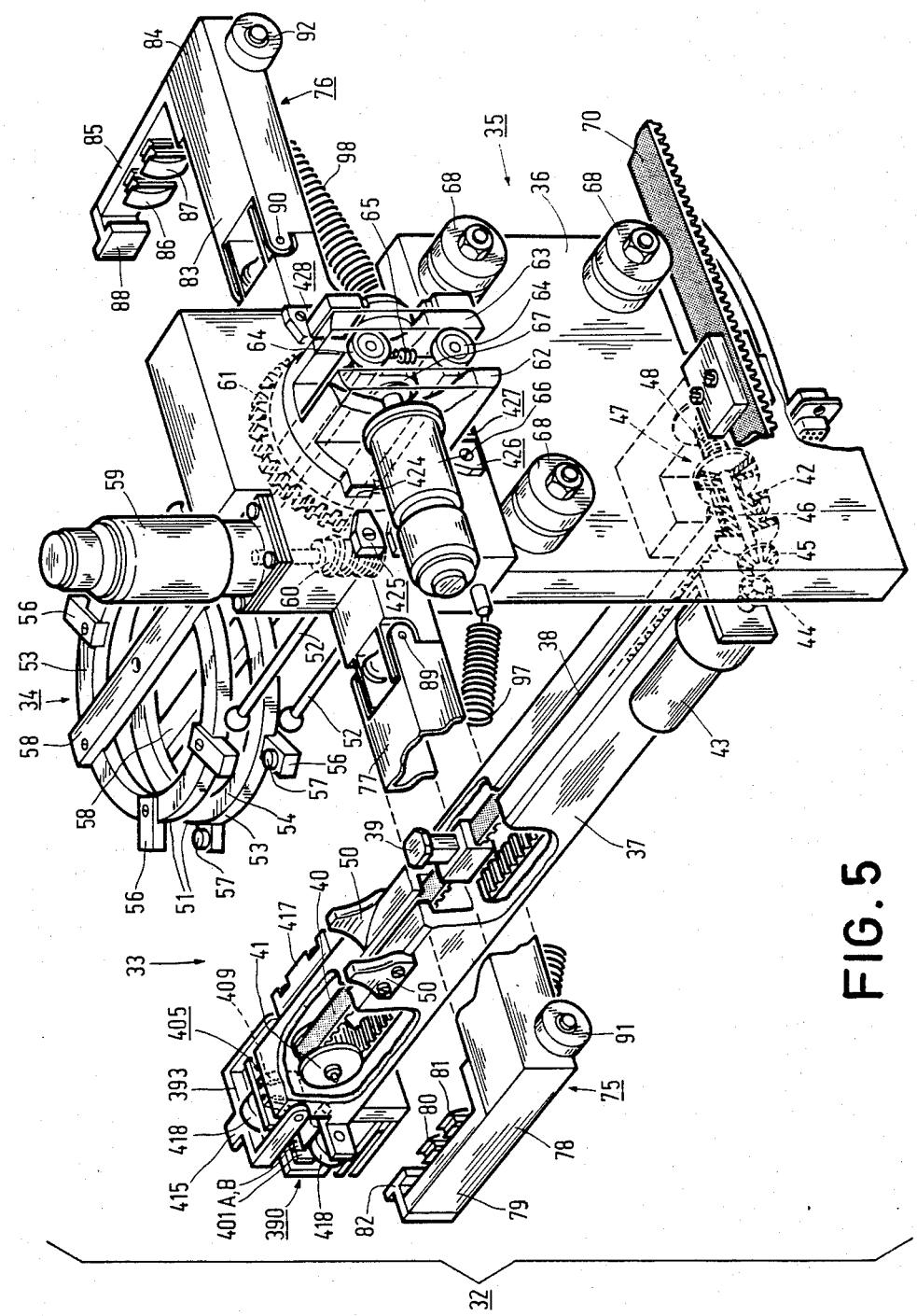
FIG. 5 is a perspective view of the greater part of an internal transport device of the storage module.

The gripping device 34 comprises two grippers 51 and four pins 52. In FIG. 4, the grippers 51 and the pins 52 are shown in a vertical position. In this position, the sliding cam 39 can insert a cassette 3 between the pins 52 and the two grippers. In FIG. 5, the grippers 51 and the pins 52 are shown in a horizontal position, pivoted through an angle of 90° for the horizontal transport of a cassette within the storage module. The grippers 51 comprise rings 53 with bevelled edges 54 for cooperation with a bevelled edge 55 of a central opening of the cassettes 3. Each ring 53 carries a number of short spokes 56 with pads 57 and is secured to a lever 58 which is movably mounted on the carriage 36.

On the carriage 36, a tilting device for the gripping device 34 is arranged. The tilting device comprises a motor 59 with a worm 60 and a worm wheel 61 driven by the worm 60. On the worm wheel, two plates 62 and 63 are arranged, to which the two levers 58 are pivoted. The pivot of each lever is disposed between the ring 53 on the one end and a roller 64 on the other end. Between the rollers 64, a tension spring 65 urges these ends of the levers 58, which are located on these sides, towards each other against the cam 67. The plate 62 carries a motor 66 which is adapted to drive a cam 67 situated between the levers 58. The cam 67 has a non-round shape so that, at a location near the rollers 64, the levers can be urged apart. As a result, the levers 58 are urged towards each other on the side of the rings 53, thus, permitting a cassette to be gripped. The tilting device enables a cassette 3 to be tilted in the transport space of the storage module from the vertical position through an angle of 90° in a first direction or in a second direction, so that either the one side of the cassette or the other side of the cassette faces upward. Thus, the cassette can be moved into one of the ports 26 or 27 in a first or a second tilted horizontal orientation.

In which of the two tilted orientations the cassette has been moved is determined by opto-electronic means. On the worm wheel 61, a mirror 424 is arranged. Four opto-electronic devices 425–428 are equipped with a light source and a light-sensitive cell and are identical to the device 405 to be described hereinafter. They cooperate with the mirror 424 in order to generate a signal indicating whether the gripping device 34 is in the vertical position or in its first or second tilted position. Moreover, they are used for controlling the motor 59 which tilts the gripping device.

The translation device 35 of the internal transport device 32 comprises the carriage 36, a plurality of rollers 68 journalled on the carriage 36, a guide ruler 69, a long toothed belt 70, a short toothed belt 71, and a drive motor 72 with pulley 73. The motor 72 comprises a built-in tachogenerator. A Gray-code shaft position indicator 391 is mounted against the motor.

The carriage 36 moves along the ruler 69 and functions as an internal transport carriage to which both the gripping device 34 and the sliding device 33 are secured. On each of the sides of said internal transport carriage, there is arranged a substantially L-shaped sensing arm 75 and 76, respectively. The sensing arm 75 comprises a first horizontal limb 77 which extends in the direction of translation of the carriage towards the front 28 of the storage module. On the end 78 of the limb 77 which is remote from the carriage, there is disposed a second limb 79 which extends in a horizontal direction transversely of the limb 77. On said second limb, two signalling elements 80 and 81 are arranged for signalling the presence and a correct horizontal position of a cassette 3. In the present example, these elements are two microswitches which are arranged adjacent each other in such a way that one, namely, the switch 80, is depressed when a cassette 3 is disposed in the gripping device 34 in the horizontal position, while the other one, namely, the switch 81, detects whether a recess 49 is disposed at the location of the switch. If this is the case, the switch 81 is not depressed. If it is not the case, the switch 81 is depressed. The two switches 80 and 81, therefore, not only ascertain the presence of a cassette 3 but also the correct orientation of the cassette. The second limb 79 carries a stop 82 for the side edge of a cassette 3.

In an identical manner, the sensing arm 76 on the other side of the carriage 36 comprises a first limb 83 having an end 84, a second limb 85, two sensing elements in the form of microswitches 86 and 87, and a stop 88. The limbs 77 and 83 of the respective sensing arms 75 and 76 are pivotable about a horizontal pin 89 and 90, respectively. Rollers 91 and 92 are respectively arranged near the end 78 of the sensing arm 75 and the end 84 of the sensing arm 76. To the second front wall 28 of the storage module 10, a run-on cam 93 is secured and has a curved slope 94. A similar run-on cam 95 having a curved slope 96 is secured to the second rear wall 29. Said cams are adapted to cooperate with the sensing arms 75 and 76. The roller 91 is movable over the curved path 94 and the roller 92 over the curved path 96. Tension springs 97 and 98 urge the ends 78 and 84 of the respective sensing arms 75 and 76 downwards into the position shown in FIG. 5, hereinafter referred to as the sensing position of the sensing arms. If one of the rollers 91 or 92 engages with the associated run-on path of the corresponding run-on cam, the sensing arm is pivoted from the sensing position to a pivoted position. In said position, the sensing arm does not impede a cassette 3 which is passed through a port 26 or 27.

Figure 6:
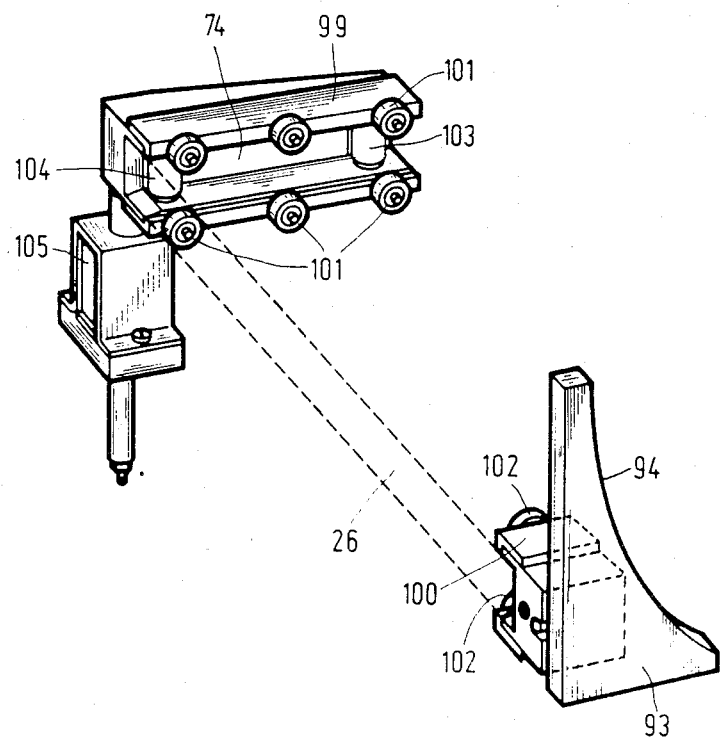
FIG. 6 is a perspective view of some parts of the storage module at a location of the front port.
Figure 7:
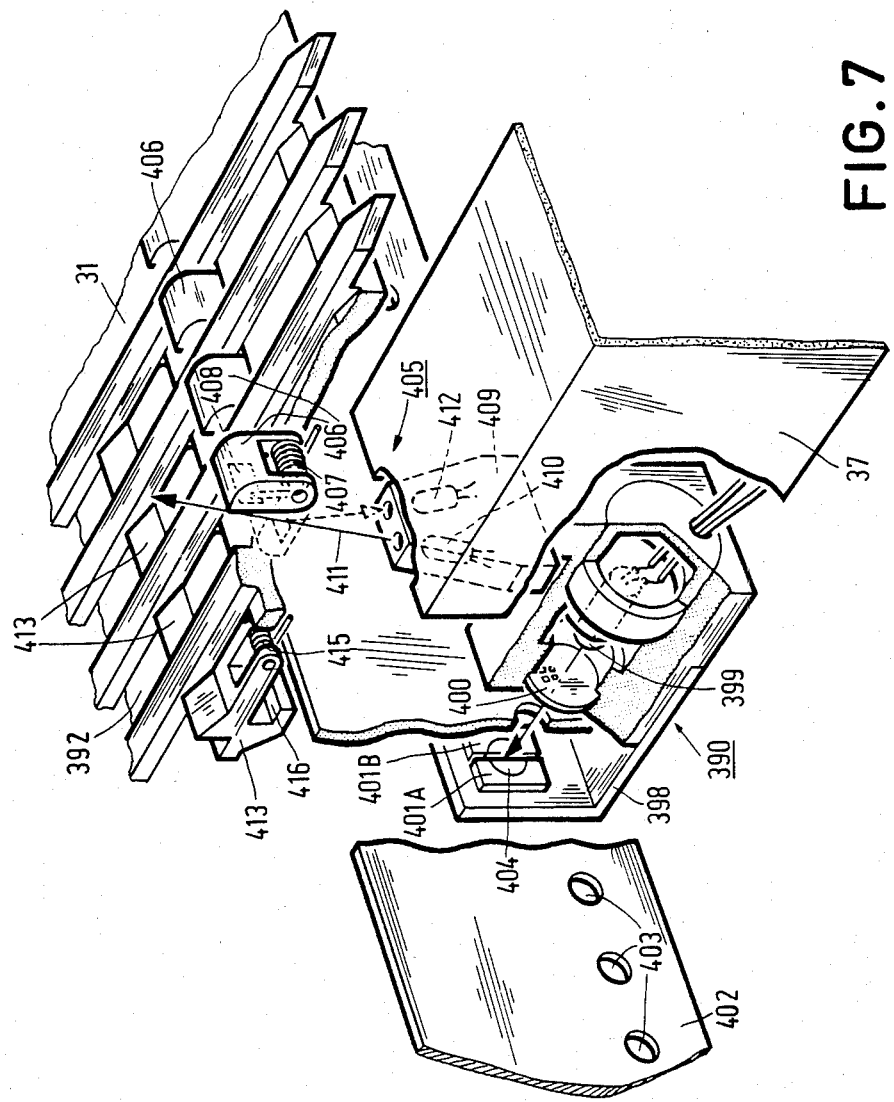
FIG. 7 is a perspective view of a number of parts of the storage module at a location of an opto-electronic locating device for accurately locating the position of a cassette in a storage rack of the storage module.

It may be desirable to block a port by means of a blocking element, thereby preventing cassettes from being inserted into the storage module at an undesired moment. FIG. 6 shows the area near the port 26 at the front of the storage module. On both sides of the port 26, guide blocks 99 and 100 are arranged. The guide block 99 carries six guide rollers 101 for guiding the upper and lower wall of a cassette. The guide block 100 carries two guide rollers 102. For guidance in the transverse direction, the guide block 99 comprises two vertical rollers 103 and 104 on a spring-loaded pressure plate 74. When a cassette is inserted it is pressed against a vertical roller (not shown) of the guide block 100 because the cassette moves the pressure plate 74 against the spring-load during insertion. Depression of the pressure plate can be prevented by means of a solenoid 105 in order to block the port 26. On the rear wall 29, guide blocks 106 and 107 are arranged, which blocks are provided with rollers 108 and 109, respectively, for guiding the bottom and top of a cassette. The guide block 106 further comprises a pressure plate 429 for the vertical rollers 110 and 111. The pressure plate 429 can be blocked by the solenoid 112.

Near the free end of the member 37, an opto-electronic locating device 390 is arranged for accurately locating the position of a cassette within the storage rack by the precise alignment of the member 37 relative to said desired position. On an L-shaped bracket 398, a light source 399, a lens 400 and a light-sensitive twin diode 401A, B are arranged. A strip 402, which extends underneath the lower rack plate 31, has openings 403 which accurately correspond to the slots 392 for the cassette 3 in the rack plate 31. The two diodes 401A, B are located behind the strip, so that a light spot 404 can only reach the diodes if the arm 37 is disposed before an opening 403. Precise positioning is possible by moving the arm until the two diodes supply signals of equal amplitudes.

A second opto-electronic device 405 detects the presence of a cassette at the relevant location. In each slot 393 of the rack plate 31, a tumbler 406 is located. A spring 407 pushes the tumbler upwards with moderate force. A cassette present in the slot urges the tumbler downwards by its weight. On the underside of the tumbler, a light-reflecting surface 408 is disposed. A light source 410 arranged in a mount 409 emits a light beam 411 which is reflected to a light-sensitive cell 412 by the surface 408 only if the tumbler 408 is depressed by a cassette.

In the slots 392, latching terminals 413 are located which engage behind a cam 414 of the cassette in order to latch said cassette in the slots. A spring 415 urges the latching tumbler upwards. Pivoted to the arm 37 of the sliding device 33 is a release bracket 393 having a stop 415 which projects into a groove 416 of the latching tumbler. The release bracket can be pivoted downwards by energizing a solenoid 417 on the side of the arm 37, so that the stop 415 pivots the latching tumbler downwards when a cassette is to be slid to the transport space by the sliding device.

Rollers 418 guide the free end of the arm 37 over a guide rod 419.

A light source 420 and a light-sensitive cell 421 detect the position of the cassettes in the storage rack via openings 22 in the cassettes.

The recorder module

The recorder module is also protected against penetration of dust and contaminants by detachable walls arranged on the mounting rack 4. The rear wall is identical to the rear wall 25 of the storage modules and has a port 27 at the same location. The front wall 422 (see FIG. 1) may be fully closed.

The recorder module (FIG. 11) comprises an internal transport device having a transport frame which mainly comprises two fixed side panels 126 and 127 which are interconnected at the rear by a transverse panel 128 and at the front by a transverse panel 423 and which is supported on a base plate 130 by means of legs 129. Said base plate is mounted in the frame 17 of the recorder module 9 by means of damping blocks 131; see FIG. 8.

In the transport frame, an upper plate 132 and a lower plate 133 are mounted so as to be movable. Relative to the surrounding transport frame said plates can perform a limited vertical movement. For guiding the vertical movements, short guide rails 134 are arranged at the corners of the transport frame, of which rails only a single one is visible in FIG. 11. The top plate 133 carries a block 135 with guide rollers 136 and 137 at each of its corners. At its corners, the bottom plate 133 is provided with a block 138 with guide rollers 139 and 140. At the corners of the transport frame, connecting plates 141 are disposed. Between the connecting plates 141 and the top plate 132, compression springs 142 are arranged. The top plate 132 and the bottom panel 133 have castellated edges 143 and 144 respectively extending at three sides. Said edges are arranged in such a way relative to each other that the projections of the one castellated edge engage the recesses of the other castellated edge. The edge 143 of the top plate 132 carries inwardly projecting pins 145, and the edge 144 of the bottom plate 133 carries identical pins 146. In the situation shown in FIG. 11, in which the recorder module contains no cassette, the pins 145 and 146 are arranged in line.

Nearer the side of the front panel 423, guide blocks 147 are provided at the left and right, which blocks contain a guide slot 148 for guiding a cassette. In the position shown in FIG. 11, the guide blocks 147 and the top and bottom plates 132 and 133 respectively are in such a relative position that a cassette can be inserted into the recorder module between the plates 132 and 133. The pins 145 and 146 extend into the slot 123 between the edges 124 of the cassette and thus do not impede insertion of the cassette, unless it is in an incorrect position, the pins nearest the guide blocks 147 butting against the cam 125 in the slot 123. A motor 149, with a spindle 150 and a turntable 151, is mounted on the base plate 130 of the recorder module. The turntable is provided with a rubber drive ring 152 and a central recess 153. It has such dimensions that it can accommodate the centering cap 119 of the optical disc 1.

For moving an optical pick-up 155 underneath the optical disc, an actuating device 154 is arranged on the base plate 130 adjacent the motor 149. The base plate 130 further carries a helium-neon laser 156 and a stationary opto-electronic unit underneath a cover 157. A light beam 158 produced by the laser 156 is deflected through an angle of 90° by a mirror 159, passes through a shutter 160 and via an aperture 161 reaches the space underneath the cover 157. By means of a stationary prism 162, the light beam is again deflected through 90°, after which it passes through a lens system 163 which causes the diameter of the light beam to increase. Subsequently, the light beam is split into two beams by a polarizing prism 164. One of said beams leaves the space underneath the cover 157 via a lens 165 and is incident on a light-sensitive cell 167 via an aperture 166. Slow intensity variations of the light beam are measured by means of said cell, so that the laser can be adjusted when a permissible minimum value is not reached. Furthermore, the cell signals whether the shutter 160 is open or closed and the signal is employed in a compensator for a tracking error signal (discussed below).

The other beam emerges through an aperture 158 in the cover 157 and is routed to a movable objective 172 via a stationary prism 169, a movable mirror 170 and a prism 171 belonging to the optical pick-up 155. The objective 172 resembles an objective type as known from U.S. Pat. No. 4,021,101 (herewith incorporated by reference). It mainly comprises a lens system arranged in a cylindrical mount, which, by means of a cylindrical moving coil, is electromagnetically movable in a vertical direction. In order to obtain an objective bearing-arrangement with an extremely low friction, the present recorder module employs an air-bearing arrangement. Pressurized air for the bearing arrangement is supplied through an air tube 173. The stationary prism 169 and the movable mirror 170 are located on a support 174 with apertures 175 and 176 for the passage of the light beam. The movable mirror 170 may be of a type as known from U.S. Pat. No. 4,129,930 (herewith incorporated by reference).

The beam reflected by the underside of the disc 1 returns to the space underneath the cover 157 via the objective 172, the prism 179, the mirror 170 and the prism 169 through the aperture 168. For simplicity, the quarter-wave plates required in the optical path have been omitted, which plates cooperate with the polarizing prisms that are used. The part of the reflected beam transmitted by the polarizing prism 164 is split into three beams for three opto-electronic units 180, 181 and 182 by a second polarizing prism 177, a third polarizing prism 178 and a prism 179. Said three units serve for converting the high-frequency beam modulation into an electrical modulation which contains the information present on the disc 1 and for generating a focusing-error signal and a tracking-error signal respectively. The focusing-error signal is employed in a control circuit for correcting the focusing position of the objective 172. The tracking-error signal is employed for correcting the position of the movable mirror 170. For a further description of the optical and electronic details of optical disc players and digital optical recorders, reference is made to the relevant literature, such as the previously mentioned article "An Optical Disc Replaces 25 Magnetic Tapes" by G. C. Kenney et al, in *IEEE Spectrum*, February 1979.

For the radial movement of the optical pick-up 155, the actuating device 154 comprises a member 183 on which the optical pick-up is arranged. The member is journalled in a yoke 184 of a linear motor which, on both sides of the member, comprises permanent magnets 186 and 187, and a linearly movable coil connected to the member 183. On both sides of the actuating device 154, stops 189 and 190 are provided, which limit the travel of the member 183.

The internal transport device of the recorder module 9 for transferring a cassette 3 between its loading position at the rear of the recorder module and the recorder operating position in the recorder module mainly comprises first means for horizontally shifting the cassette between the top plates 132 and 133 and second means which serve for moving the disc 1 vertically towards the turntable 151 and, at the same time, slightly opening the cassette.

By means of the external transport device to be described hereinafter, a cassette, through a port 27 and via the slots 148 of the guide blocks 147, is shifted over some distance between the plates 132 and 133, a plurality of freely rotating guide rollers 191 in the bottom plate 133 contributing to a low resistance. On the top plate 132 a U-shaped bracket 192 is arranged, which bracket pivots about two pins 193. On the bracket 192 a spindle 194 is journalled, which spindle drives drive rollers 195 on both sides of the bracket. Via gear wheels 196 and 197, the spindle can be rotated by a motor 198 which is rigidly connected to the bracket 192. By means of two pressure springs 199, which press against a stationary bar 200 on the upper side of the recorder frame, the bracket 192 is urged downward. By means of a solenoid 201, a right-angled lever 202, a cam 203 and a roller 204 connected to the bracket 192, the bracket 192 can be lifted slightly against the pressure of the springs 199. The bracket 192 is retained in the slightly lifted position during insertion of a cassette, so that the rollers 195 do not impede insertion. In the top plate 132, two light sources 430 and 431 are mounted. The first source cooperates with a light-sensitive cell 432 in the bottom plate 133 and a second source with an identical cell, not shown. The power supply to the solenoid 201 is not turned off and the rollers 195 are not urged onto the upper side of the cassette by the springs 199 until a cassette has been moved past the rollers 195 between the top and bottom plates 132 and 133, which is signalled by the light-sensitive cell 432. By energization of the motor 191, the cassette can then be moved further between the plates 132 and 133 in a horizontal direction.

Three microswitches 205, 206 and 207 cooperate with the edge of the inserted cassette, the switch 207 sensing the position of the recess 49 at the rear of the cassette in order to ascertain whether the cassette is correctly positioned in the recorder. By the use of two switches 205 and 206, oblique positioning of the cassette can be detected. In each of its covers, the cassette has a slot 208, which in the recorder should face downwards to allow the passage of the light beam from the laser. In FIGS. 4 and 10 the cassettes 3 are shown in a version in which the slot 208 is open. An embodiment of a cassette provided with means for closing the slot 208 is described in U.S Pat. No. 4,358,801 (herewith incorporated by reference). At the rear of the transport frame a bracket 209 is arranged, which is adapted to cooperate with slide portions which project from the cassette, which slides serve for closing the slot 208 and belong to said cassette.

When the rollers 195 have moved the cassette completely between the plates 132 and 133, the opening 118 of the optical disc 1 is situated above the turntable 151 and underneath a disc hold-down device 210. By means of a pin 211, said disc hold-down device is mounted on a vertically movable traversing mechanism 212 which runs over the top plate 132. Between the disc hold-down device 210 and the traversing mechanism 212, a compression spring 213 is arranged which urges the disc hold-down device downwards. In the top plate 132, an aperture 214 is formed for the passage of the disc hold-down device.

The second part of the internal transport device of the recorder module, for vertically moving the optical disc 1 onto the turntable 151, comprises a motor 215 which drives a toothed cam 217 by means of a pinion 216. Said cam is rigidly connected to a rod 218 to which a similar cam 219 is rigidly secured on the other side of the recorder. However, the cam 219 is not formed with teeth. The rod 218 is journalled in the side plates 126 and 127 of the transport frame, so that the cams 217 and 219 can perform a rotary movement. By means of pivots 220, the two cams are pivotally connected to a left-hand and a right-hand slide 221 respectively. Said pins each move in a slotted hole of the corresponding slide. The slides are slidably arranged on the side plates 126 and 127 of the transport frame by means of a plurality of guide rollers 22.

The bottom plate 133 comprises laterally projecting pins 223, which engage slots 224 in the slides 221. The traversing mechanism 212, on which the disc hold-down device 210 is arranged, comprises side plates 225 which are vertically movable on the side plates 126 and 127 of the transport frame and which are guided by guide rollers 226. The side plates 225 of the traversing mechanism 212 carry pins 227 which engage slots 228 of the slides 221.

As the spindle 218 rotates, the slides 221 are moved in their axial direction. Owing to the shape of the slot 228, the traversing mechanism 212 is then moved downward via the pins 227. At a later instant, the pins 223 also move the bottom plate 133 downward. The top plate 132 follows the movement of the bottom plate 133 under the influence of the pressure exerted on the top plate 132 by the compression springs 142. At a specific instant, the guide rollers 136 reach stops 227, which prevent the top plate 132 from moving further downward. The pins 145, which project into the slot 123 of an inserted cassette, retain the upper cover 120, so that it cannot move further downwards. The bottom plate 133 is moved further downward and via the pins 146 it moves the cassette cover which is disposed nearer the turntable 151. During this downward movement, the traversing mechanism 212 and thus the disc hold-down device 210 are moved further downward. At a certain instant the disc 1 is positioned on the turntable 151. The lower cover of the cassette is moved slightly further downwards by the pins 146 and the disc hold-down device 210 is pressed onto the upper cap 119 of the disc, so that the disc is centered and pressed in place on the turntable. The two covers 120 are now separated from each other in such a way that the disc 1 can be rotated inside the covers.

During the stroke of the two slides 221, the end 228 of a spring 229 arranged around the rod 219 is pressed against the cassette. This additional pressure, which is directed towards the switches 205–207 and the bracket 209, is necessary to overcome the counteracting pressure of the switches. Moreover, in the case of cassettes provided with slides for the slots, which slides can be opened by the bracket 209, there are provided springs for closing the slides. The spring force of said springs is also overcome by means of the spring 229, so that the cassette is urged into its correct final position between the plates 132 and 133.

The rod 218 further comprises an element 230 which moves with the rod 218. Said element ensures that the covers 120 of the cassette remain sufficiently spaced from each other at the side of the rod 218. This is required in those cases in which the covers 120 are not entirely rigid and may therefore slightly sag. The pins 145 and 146 are disposed on three sides of the transport frame only, but not on the side of the rod 218, so that at this location the covers 120 could sag, so that the distance between the covers would become too small.

Figure 11:
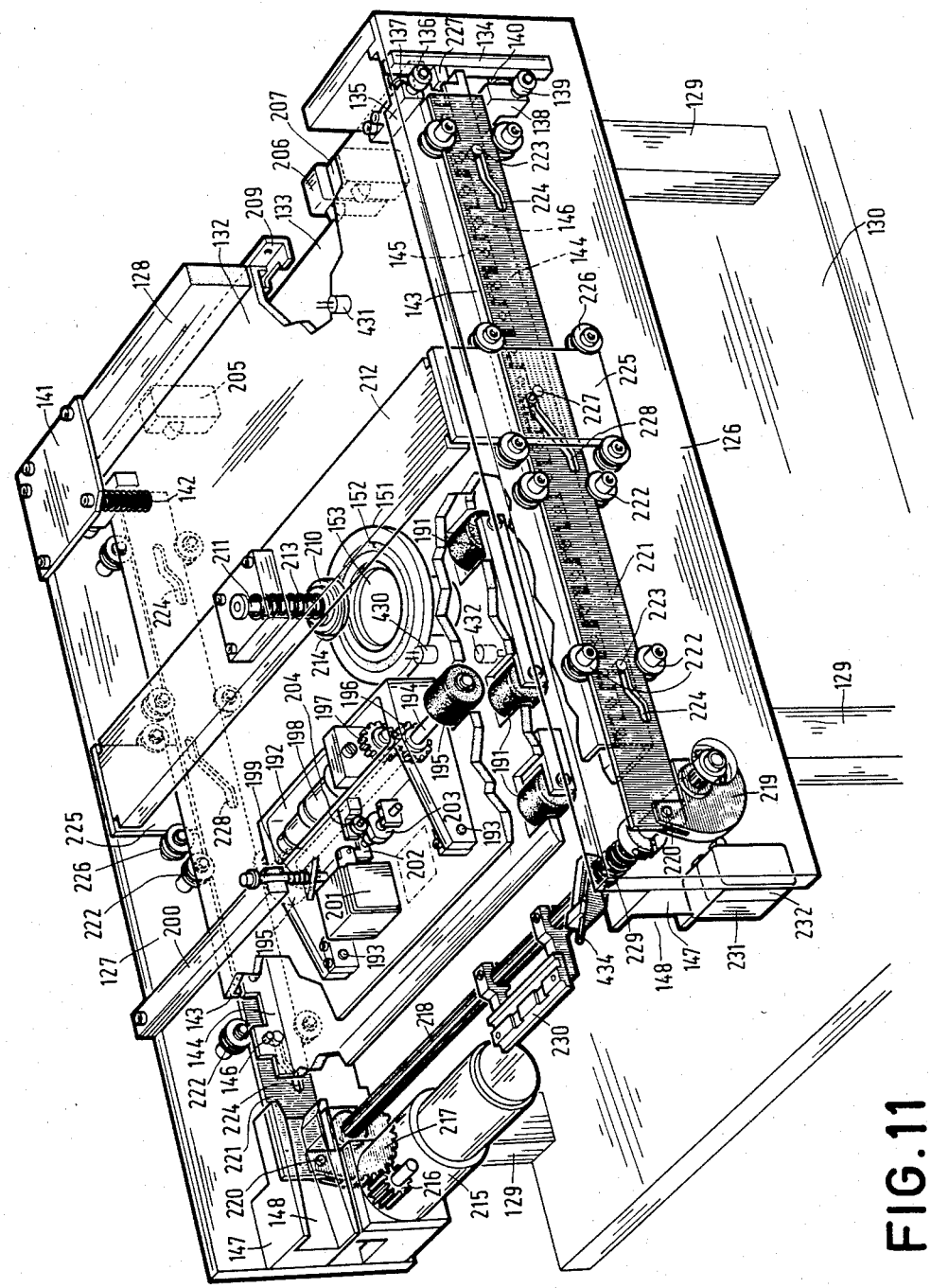
FIG. 11 is a partly cut-away perspective view of a part of the recorder module of FIG. 8.
Figure 12:
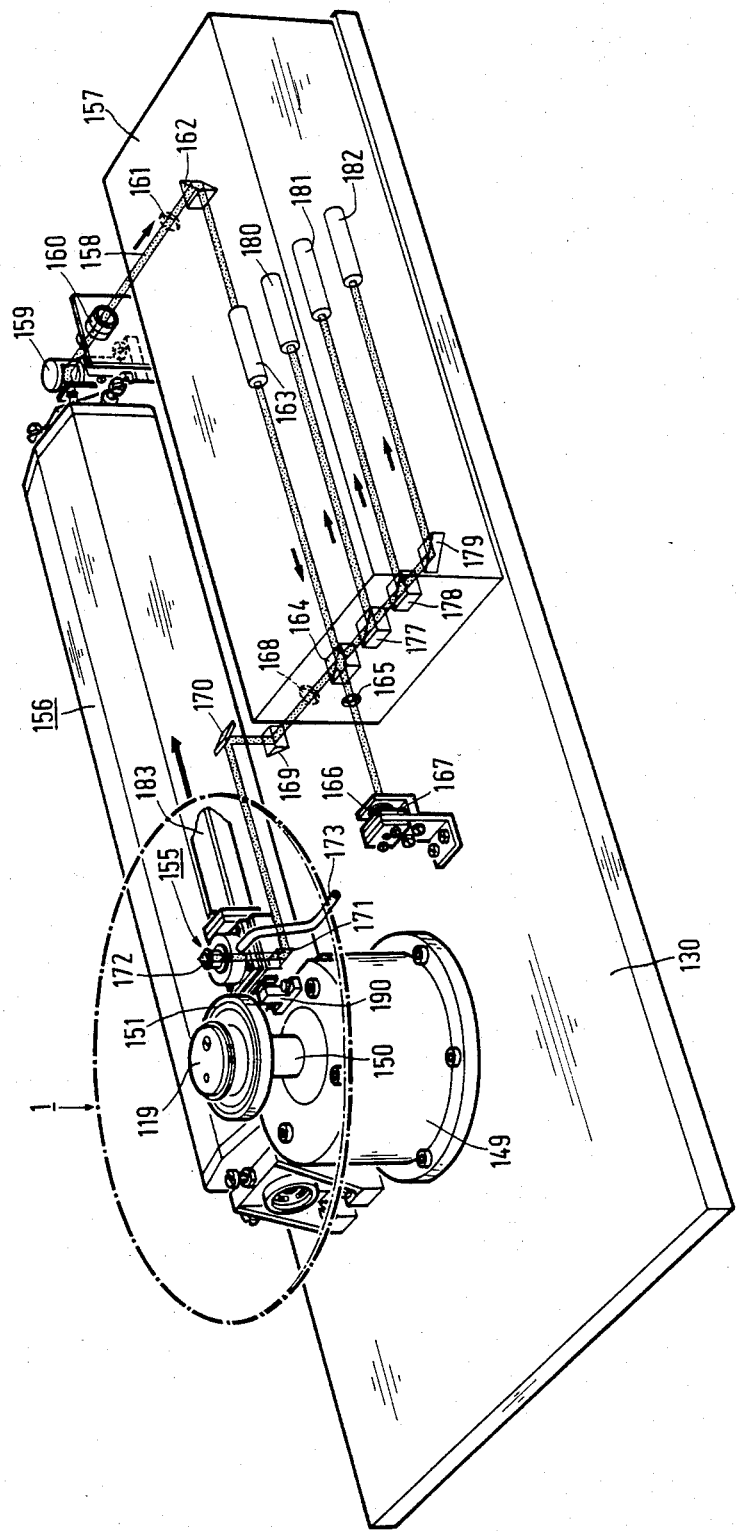
FIG. 12 is a partly cut-away perspective view of another part of the recorder module of FIG. 8.

For controlling the movements of the two slides 221, there are provided two switches 231 and 232, of which the last-mentioned switch cooperates with the non-toothed cam 219 and the first-mentioned switch with a cam (not shown), which is located behind the cam 219 in FIG. 11. The two final positions of the slides 221 are detected by means of these two switches.

Inside the module frame 17 of the recorder module, there are also located a plurality of bins 234 equipped with electronic circuits. Furthermore, there is provided a plate 235 on which a plurality of connectors 236 are mounted for the electrical connections of the recorder module.

The external transport device

The external transport device comprises a cassette changer 237 which is movable inside the enclosure of the data-storage system along the back of all the recorder modules and storage modules in a horizontal and a vertical direction. On the rear of the data storage system, there are disposed an upper horizontal gear rack 238 and a lower horizontal gear rack 239. Furthermore, there are provided an upper horizontal guide rod 240 and a lower horizontal guide rod 241. The two horizontal guide rods 240 and 241 guide a carriage 242 which is horizontally movable along the back of the data storage system, which carriage can be moved horizontally along the two gear racks 238 and 239 by means of gear wheels 243 and 244.

The carriage 242 mainly comprises an upper and a lower part which are interconnected by four vertical posts 245, 246, 247, 248. The upper part of the carriage 242 comprises a drive unit for the horizontal movement of the carriage and for the vertical movement of the cassette changer 237. The drive unit comprises a frame plate 249, two flange plates 250 and 251, side plates 252 and 253, a spacer rod 254, two guide blocks 255 and 256, two motors 257 and 258, a shaft 259 traversing the spacer 254, on which shaft pulleys 260, 261 and 262 are mounted, a drive pulley 263 on the spindle of the motor 258, a bevel gear 264 on the spindle of the motor 257, a bevel gear 265 and a drive shaft 266, on which the bevel gear 265 is mounted, and two gear wheels 243 and 244. The two motors 257 and 258 are each provided with a build-in tachogenerator and a Gray-code shaft-position indicator.

The lower part of the carriage 242 comprises two side plates 267 and 268 which are interconnected by means of a spacer rod 269. On said spacer rod, blocks 270 and 271 are arranged, which blocks are connected to guide blocks 273 and 274 by means of leaf springs 272. Diverting pulleys 275 and 276 are mounted on the side plates 267 and 268 so as to be freely rotatable.

The motor 258 drives the two pulleys 260 and 261 via a toothed belt 267. The pulley 260 cooperates with a toothed belt 278, which at the lower side is diverted by the pulley 275. The pulley 276 drives a toothed belt 279, which at the lower part is diverted by means of the pulley 276.

The cassette changer 237 is accommodated in a frame which comprises a side plate 280, a side plate 281 and a connecting plate 282. The side plates 280 and 281 of said frame are connected by the toothed belts 278 and 279 respectively and slide over the guide rods 246 by means of ball guide bushes 283 and 284. On the other side, two sets of ball bearings 285 A, B and 286 A, B are present, which run on the rod 248. In order to compensate for the weight of the cassette changer and the mounting rack, there are provided counterweights 287 and 288, which are also connected to the respective toothed belts 278 and 279 and which are guided along the respective guide rods 245 and 247.

The cassette changer mainly comprises a changer frame comprising two side plates 290 and 291 and intermediate plates 305 and 306, which are connected to each other by means of eight hollow spacers 292 to 299. Through the spacers, threaded rods 300 extend onto which nuts 301 are fitted. Each of these spacers comprises a plurality of separate portions which are, together, arranged on a threaded rod. On both sides of the changer frame, laterally projecting suspension pins 302 and 303 are located, by means of which the cassette changer is suspended in the frame 280 so as to be slightly pivotal. A limited pivotal range is important for the correct operation of the cassette changer in order to enable compensation for small positioning errors of the cassette changer relative to the slots 27. The side plates 280 and 281 of the mounting rack comprise rubber stops 304, which limit the pivotal movements of the cassette changer relative to the mounting rack.

Figure 14:
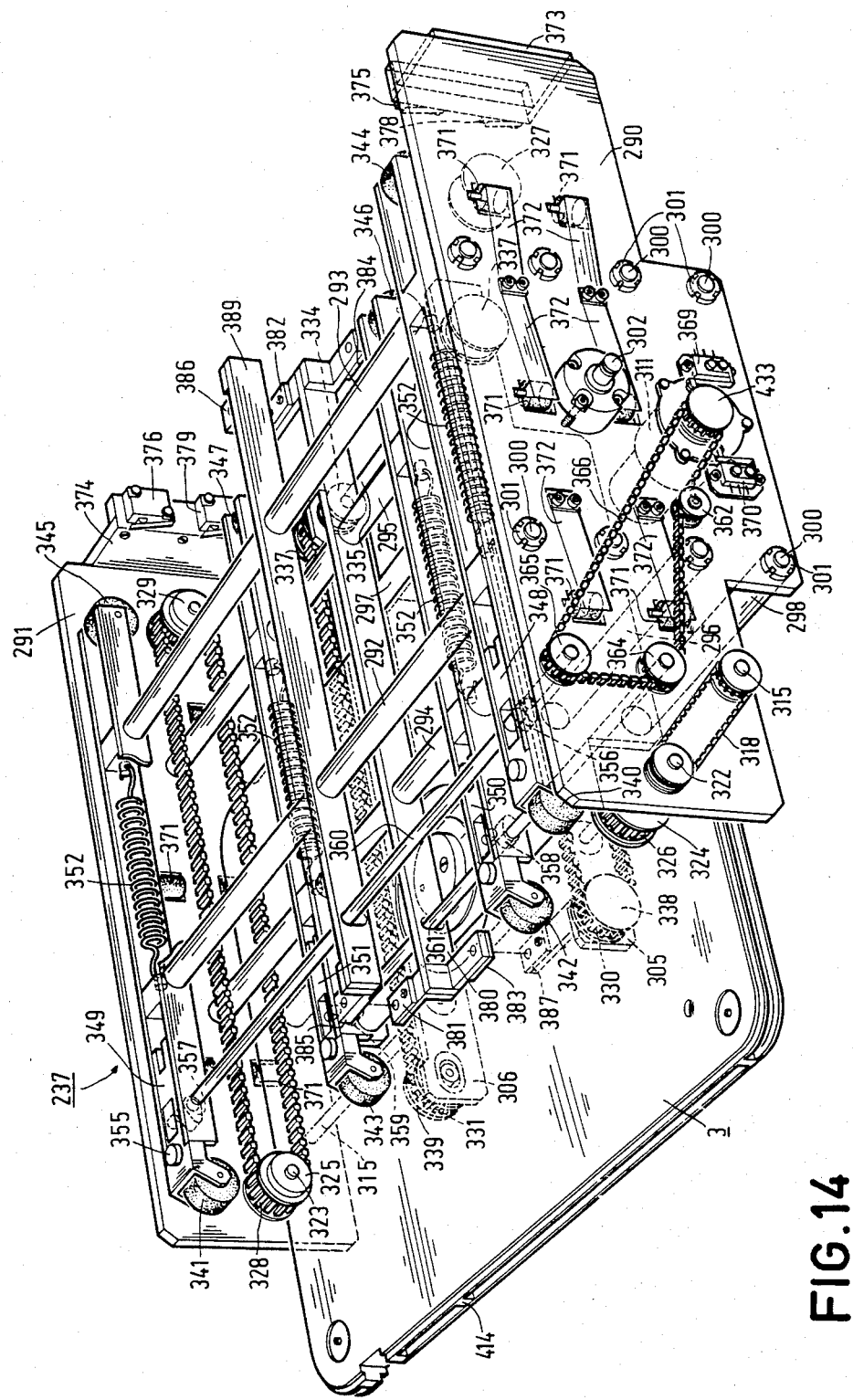
FIG. 14 is a perspective view of a cassette changer of the external transport device, a single cassette being partly disposed inside the cassette changer.
Figure 15:
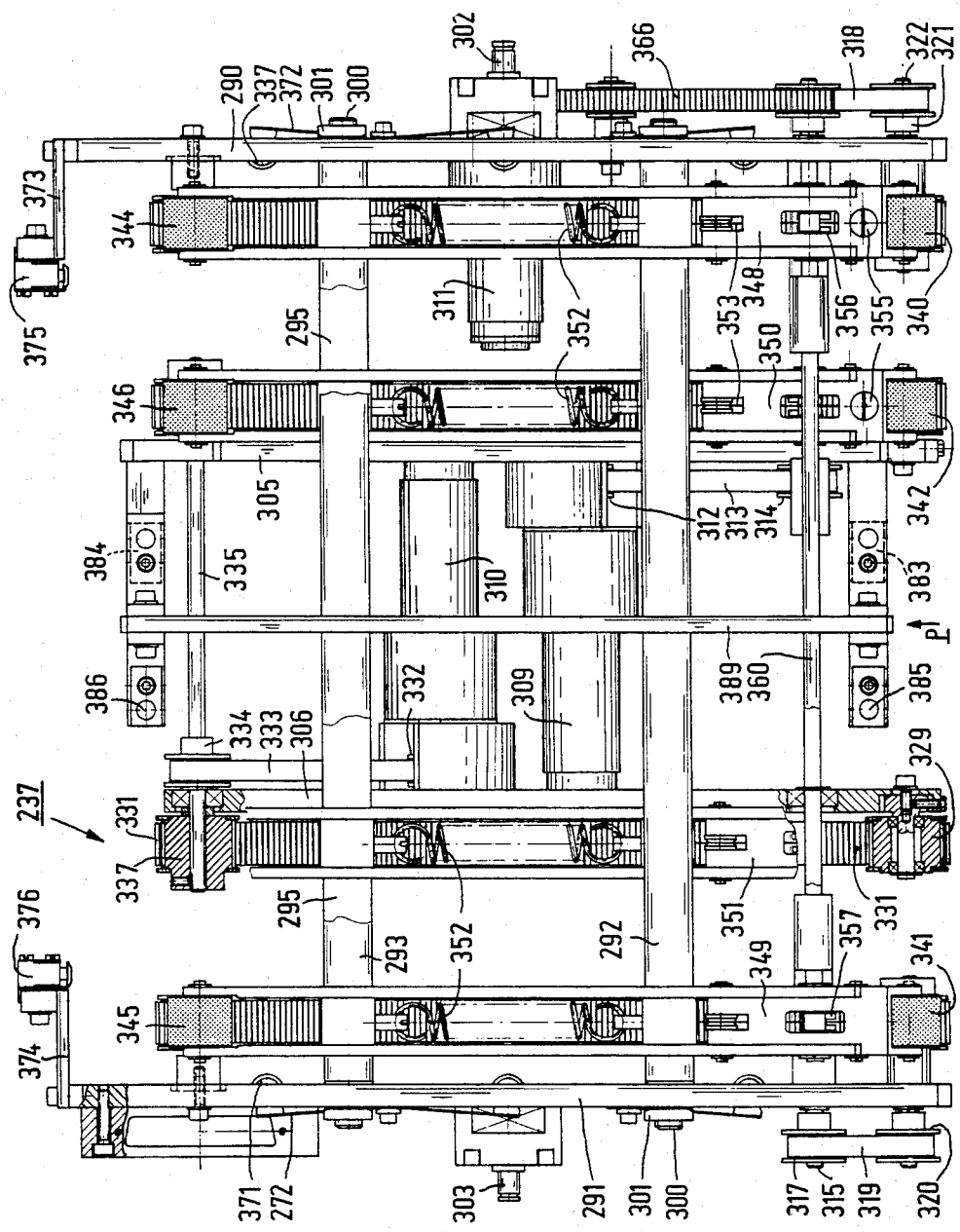
FIG. 15 is a partly sectional and partly cut-away plan view of the cassette changer of FIG. 14.
Figure 16:
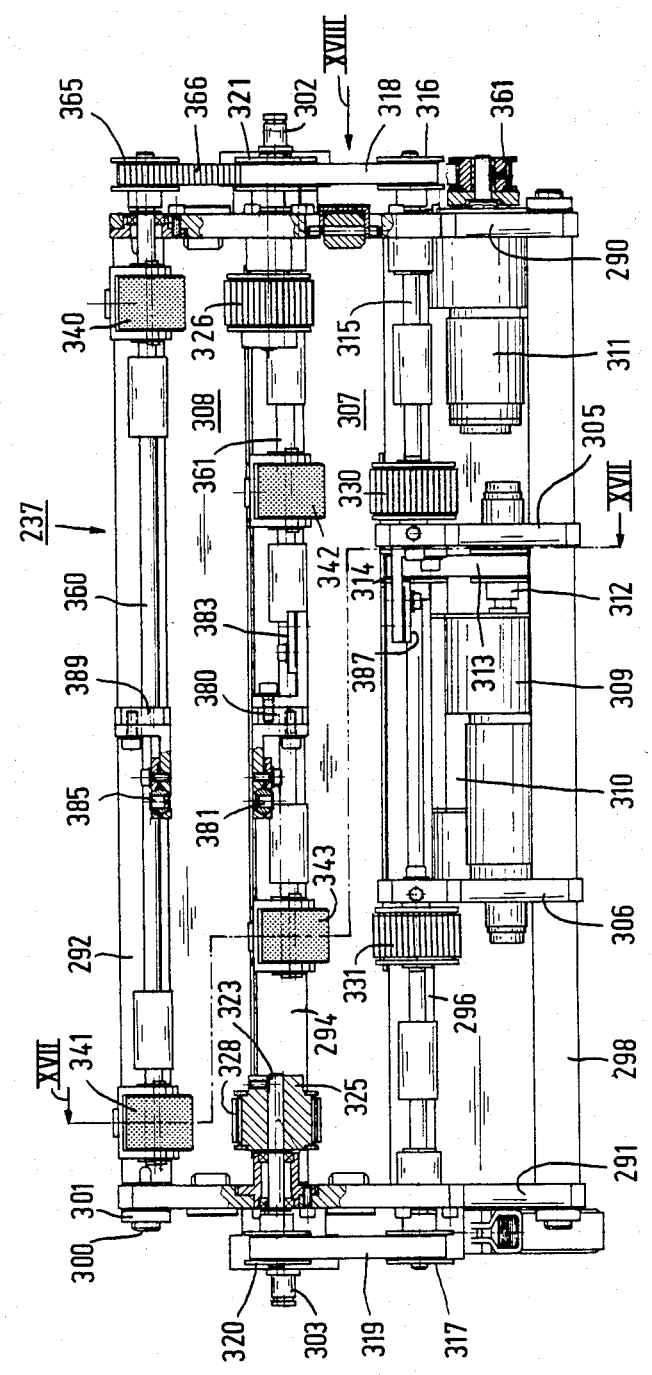
FIG. 16 is a partly sectional and partly cut-away view of the cassette changer of FIG. 14, viewed from the data storage system.
Figure 17:
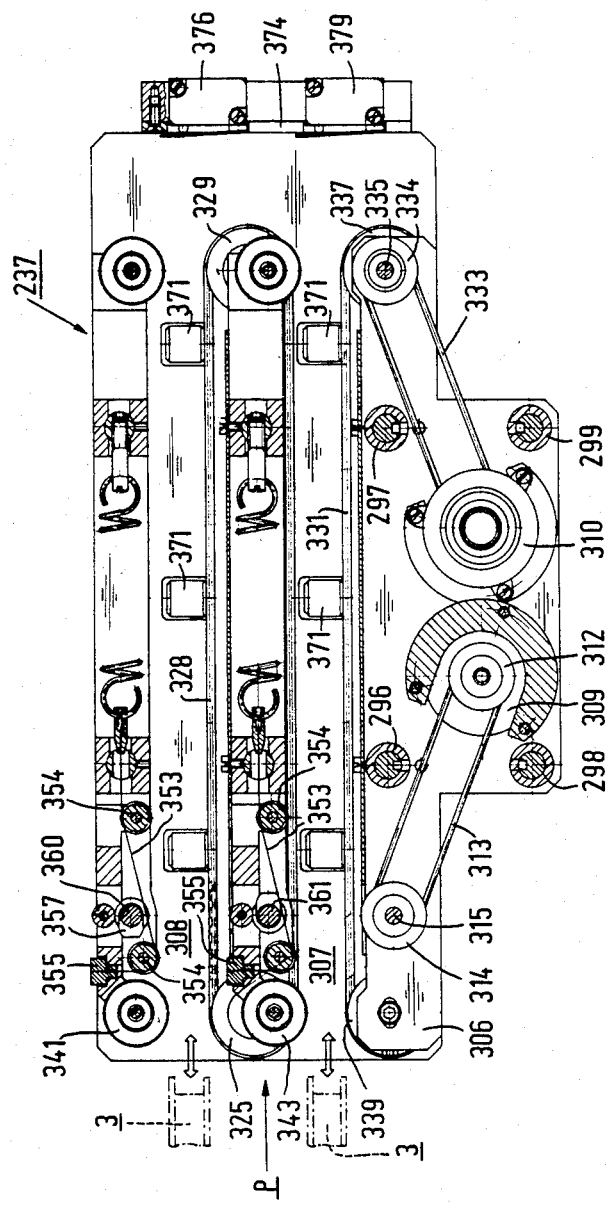
FIG. 17 is a cross-sectional view of the cassette changer taken on the line XVII—XVII in FIG. 16.
Figure 18:
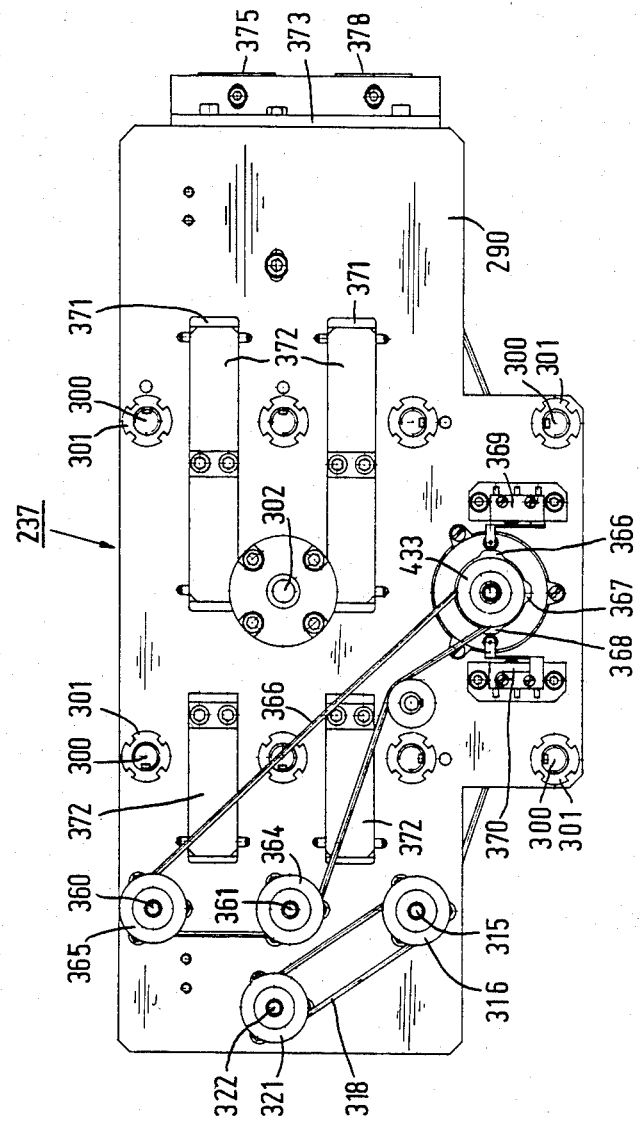
FIG. 18 is a side view of the cassette changer in the direction of the arrow XVIII—XVIII in FIG. 16.

The cassette changer is equipped with two retaining devices (330, 331, 342, 343; 326, 328, 340, 341) for two cassettes, so that two cassettes can be interchanged at the back of a module. In the cassette changer, two compartments 307 and 308 are formed for the insertion of a cassette 3. FIG. 14 shows a cassette 3 partly inserted in the compartment 307. The cassette changer is equipped with three motors 309, 310 and 311. The motors 309 and 310 are equipped with tachogenerators. Motor 310 drives a belt 313 via a pulley 312 mounted on its spindle. Said belt runs over a pulley 314 which is rigidly connected to a traversing shaft 315. Said shaft projects from the side plates 290 and 291 and carries pulleys 316 and 317 at the outer side of said side plates. Via short belts 318 and 319, said pulleys drive two pulleys 320 and 321, respectively, which, via short shafts 322 and 323, drive pulleys 324 and 325, respectively, which are situated at the inner side of the side plates 290 and 291. A track chain 326 runs over a pulley 324, which chain at the other side runs over a freely rotatable pulley 327, which pulley is adjustable in order to tension the track chain. The track chain 328 runs over the pulley 325 and over a freely rotatable pulley 329, which is also adjustable. Thus, the two track chains 326 and 328 can be driven simultaneously and synchronously by the motor 309. By means of the two track chains, a cassette 3 can be fed into the compartment 308 of the cassette changer. For the insertion of a cassette into the compartment 307, there are provided two similar track chains 330 and 331. The motor 310 is provided with a pulley 332 which drives a belt 333 which runs over a pulley 334. Said pulley is rigidly connected to a traversing shaft 335 which extends in a lateral direction beyond the two intermediate plates 305 and 306. The track chains 330 and 331 are passed over pulleys 336 and 337 which are rigidly mounted on the shaft 335. On the other side, the track chains 330 and 331 are guided over freely rotatable pulleys 338 and 339, respectively, which are again adjustable.

In the compartments 307 and 308 of the cassette changer, the cassettes are supported by the track chains. Thus, they can be moved in said compartments by means of the motors 309 and 310. In order to avoid slipping between the cassettes and the track chains, there are provided pressure rollers 340 to 343 for urging the cassettes onto the track chains. The pressure rollers 340 and 341 urge a cassette against the track chains 326 and 328 in the upper compartment 308; the pressure rollers 342 and 343 urge a cassette against the track chains 330 and 331 in the lower compartment 307. In addition to said pressure rollers, there are provided guide rollers 344 and 345 for a cassette in the upper compartment 308 and guide rollers 346 and 347 for a cassette in the lower compartment 307.

The pressure rollers should not impede entry of the cassettes into the cassette changer. Therefore, they are arranged on slightly pivotable levers 348 to 351, which during insertion of a cassette can slightly be pivoted away. Tension springs 352 pull the pressure rollers downwards by means of metal wires 353 which run over rollers 354 and which terminate in caps 355. For pivoting the levers, cams 356 and 359 are provided, which cams are rigidly connected to the shafts 360 and 361. Said shafts can be rotated through a limited angle by the motor 311 which, via pulleys 362 to 365 and a toothed belt 366, drives the two shafts 360 and 361. On the pulley 433, cams 366, 367, 368 are arranged in order to detect and control the degree of rotation of the shafts 360 and 361 by means of two switches 369 and 379.

The orientation of the cams on the shaft 360 is opposed to that of the cams on the shaft 361. By having the motor 311 rotate anti-clockwise or clockwise, either the one set of pressure rollers or the other set of pressure rollers is lifted, but never both sets of pressure rollers at the same time.

In order to retain cassettes in the cassette changer, there are provided pressure rollers 340 to 343, which exert pressure on the upper side of a cassette. A plurality of rollers 371 has been provided on the side plates 290 and 291 and can exert lateral pressure on a cassette by means of leaf springs 372 if said cassette is slightly shifted in the lateral direction relative to the neutral position.

For sensing the presence and the position of a cassette in the cassette changer, there is provided a plurality of switches 375 to 378 on two back plates 373 and 374. On a center plate 380, four light sources 381 to 384 are arranged. Said sources emit light beams in the direction of light-sensitive cells 385 to 388 on the center plate 389 and on the intermediate plate 305. By means of these light sources and light-sensitive cells, the presence of a cassette in the cassette changer can be sensed at two locations, in order to control the motor 311 which actuates the pressure rollers and for duly breaking the track chains when the end position is approached.

Figure 2:
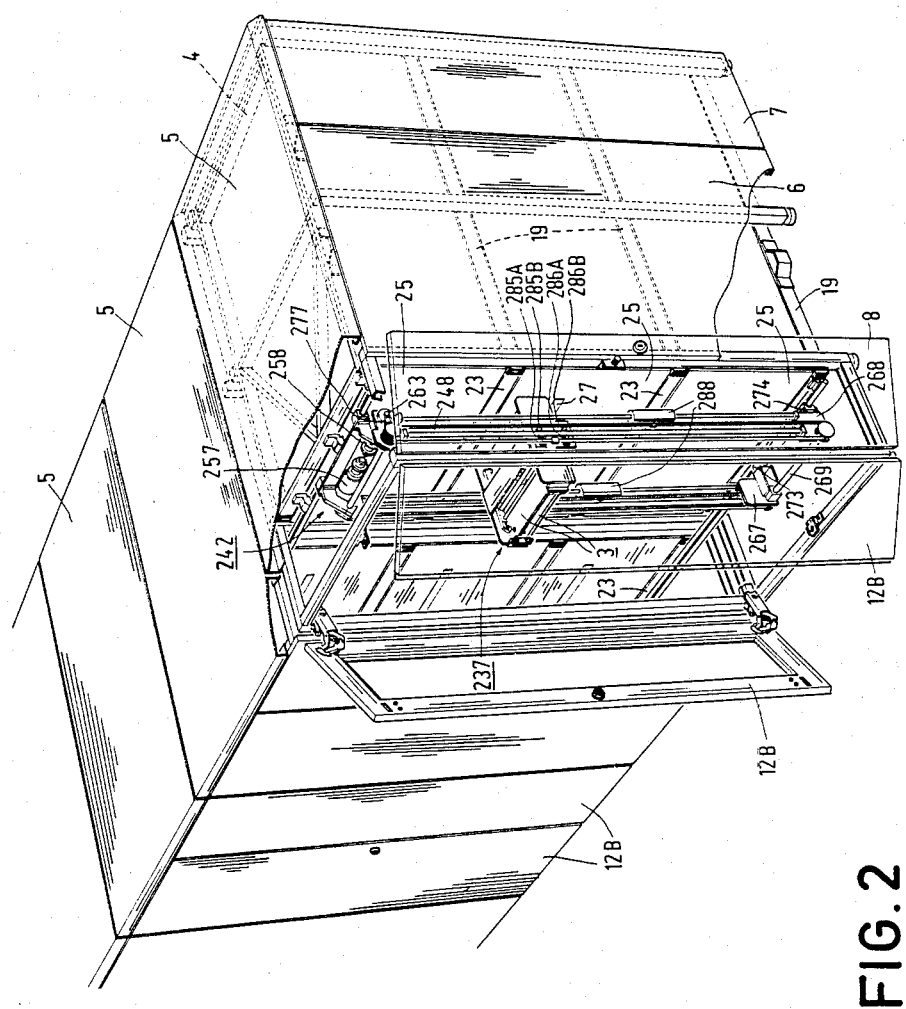
FIG. 2 is a perspective rear view of the modular storage system in accordance with FIG. 1.
Figure 13:
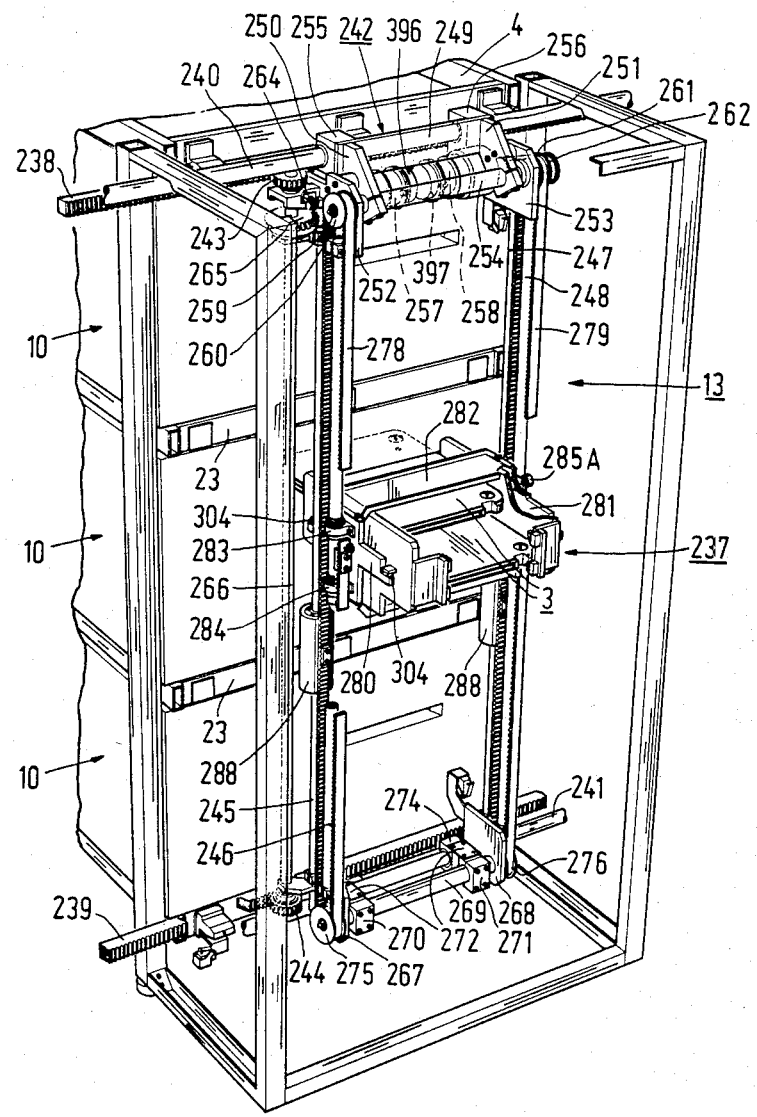
FIG. 13 is a perspective view of the external transport device at the back of the data storage system.

For the sake of clarity, a number of details of the cassette changer which are shown in FIG. 14 have been omitted in FIGS. 2 and 13.

Operation of the data-storage system

The data-storage system is controlled by means of an external computer and with internal control computers in a control module. The internal computers never communicate directly with each other but only via the external computer. The recorder modules, the storage modules and the external transport device are equipped with separate microprocessors, which may be located in the control module, for controlling the internal module functions and for communication with the outside computer. Since the control system is not the object of the present invention, it will only be discussed when it is of importance for the description of the operation of the data-storage system in accordance with the invention.

The present description is based on an initial situation in which all cassettes are disposed at their locations in the storage modules and in which the system is inoperative. When the system is put into operation, the internal transport devices execute a locating routine in each storage module under control of its control computer, which routine services for accurately locating the cassette positions. The motor 72 moves the carriage 36 from the beginning to the end of the ruler 60, the optical device 390 generating position signals upon passage of the holes in the strip 402, the maximum values of the signals corresponding to the positions of the cassette slots 391 in the lower rack plate 31. The signals from the optical device 390 are related to the position code of the carriage 36 of the translation device 35 signalled by the rotating Gray-code shaft-position indicator 391. Thus, each cassette location is periodically stored in Gray-code in a memory. The resolution of this method of locating the cassettes is 0.2 to 0.3 mm. An internal transport device without any backlash is essential in this respect. If desired, said locating routine may be repeated at regular intervals, for example, daily. In the memory of the external computer, two addresses are assigned to each cassette, one for each side of the optical disc. Each address contains a code number of the storage module and a code number of the location of the cassette in the storage rack within the storage module.

Requests for reproduction or storage of data are applied to the control computer of the storage module by the external computer in the form of addresses. After it has been ascertained which cassette is to be removed from a storage module, the external computer feeds a signal to the relevant storage module in which the desired cassette is located. The internal transport device of said storage module moves towards the cassette, which is disposed at the specified location, under control of the Gray-code shaft-position indicator 391. The internal transport device 32 is then moved in the longitudinal direction of the storage module by the motor 72. The sliding cam 39 is in such a position that it can move underneath the cassettes through recesses 49 of the cassettes.

The rings of the gripping device 34 are in the vertical position, as is shown in FIG. 4. When the specified cassette location is reached the unlatching bracket 393 is energized, so that the latching tumbler 394 is pivoted away and the relevant cassette can be pulled forward by the sliding cam 39. The motor 43 is energized and the sliding cam 39 moves in the direction of the carriage 36; the position of the sliding cam is detected by a Gray-code shaft-position indicator 395 on the motor 43. When the cassette is being pulled out of the storage rack the cassette is slightly guided by the two guide cams 50 on the member 37. Furthermore, the cassette, when it is slightly further pulled out, is supported by the pins 52 between which the cassette is moved. The gripping device 34 is open, so that the rings 53 do not impede the movement of the cassette out of the storage rack. The end position of the cassette is detected by opto-electronic means, not shown. Subsequently, the motor 43 is deenergized and the motor 66 is energized, so that the cam 67 is rotated and the levers 58 are moved, thereby causing the rings 53 to move towards each other. The bevelled edges 54 of said rings ensure that the circular and bevelled rim 55 of the cassette is centered relative to the gripping device 34 while, in addition, a small vertical displacement (approximately 1.5 mm) is produced, so that the cassette clears the bar 37. The pads 57 are in contact with the cassette in order to prevent a rotation of the cassette.

Via the address, the external computer has specified which side of the optical disc is to be used. The motor 59 is energized and rotates in such a direction that the gear wheel 61 tilts the gripping device 34 in the correct direction. Tilting is terminated in that the opto-electronic device 425 or 428 detects the selected horizontal position of the cassette. Subsequently, the motor 72 of the horizontal transport device is switched on again and the cassette is moved to the rear port 27. If possible, tilting and internal transport are effected simultaneously. This depends on the starting position of the carriage 36 and, thus, on the address of the selected cassette. When the back of the storage module is reached the roller 92 rolls along the run-on path 96 of the cam 95, so that the sensing arm 76 is pivoted upward. The carriage 36 is advanced until the cassette is disposed in a transfer position in the slot 27 in which the cassette projects partly from the storage module.

Meanwhile, the external transport device, under command of its control computer, has positioned the cassette changer 237 before the port 27 of the relevant storage module. The motor 257 then drives the carriage 242 via the gear wheel 243 in a horizontal direction along the back of the module, the position being signalled by a Gray-code shaft-position indicator 396 on the motor 257. The motor 258, which, via the pulleys 260 to 263 and the toothed belts 278 and 279, drives the frame for the cassette changer 237, is also equipped with a Gray-code shaft-position indicator 397. The internal control computer, thus, constantly receives information as to the horizontal and vertical position of the cassette changer and, by energization of the motors 257 and 258, can send the cassette changer to any point at the back of the data storage system covered by the external transport device, the position of each being defined by a horizontal and a vertical coordinate. For a fast and effective movement of the cassette changer along the back of the data-storage system, the control computer may be programmed in such a way that the horizontal and vertical movements can be performed simultaneously whenever possible.

Obviously, it should be avoided that a cassette changer moves towards a port at the back of a module at the instant that a cassette is located in said port in the loading position, because in that case damaging of the cassette and of the data storage system is not unlikely. This situation is precluded in that the external computer ensures that the cassette changer 237 is first moved to its ultimate position in front of the port before the internal transport device of the storage module is allowed to move the cassette through the port into the loading position.

The internal transport device of the storage module moves the cassette through the port 27 so far outwards that the cassette is transferred to one of the compartments 307 and 308 of the cassette changer, above the track chains which are disposed at the underside of the relevant compartment and underneath the pressure rollers which have been pivoted away by means of the motor 361. Assuming that the cassette is disposed in the lower compartment 307 of the cassette changer, the cassette, as is shown in FIG. 14, will be disposed on the track chains 313 and 331 and underneath the pressure rollers 342 and 343, which is detected by the light-sensitive cells 383 and 387. The cassette in the loading position can now be taken over by the cassette changer. By means of the motor 361, the pressure rollers 342 and 343 are swung down, so that said rollers bear on the top of the cassette under the influence of the tension springs 352 and urge the cassette onto the track chains 330 and 331. In the storage module, the motor 59 is energized, so that the gripping device 34 is opened, as a result of which the rings 53 no longer retain the cassette and do not impede a further outward displacement of the cassette. The motor 310 of the cassette changer is started and the track chains 330 and 331 pull the cassette further into the cassette changer into an end position which is detected by the end switches 378 and 379. The light-sensitive cells 383, 388 supply a signal for braking the motor 310 slightly before said end position.

The external transport device now positions the cassette changer in front of the port of the recorder module. Subsequently, the cassette is moved in the reverse direction by the cassette changer and, via the guide slots 148, it is inserted between the plates 132 and 133 of the recorder module. The solenoid 201 is energized, so that the rollers 195 do not impede the insertion of the cassette into the recorder module. The cassette changer moves the cassette in the recorder module into a transfer position in which the cassette is located underneath the rollers 195, which is detected by the light-sensitive cell 432. A further displacement of the cassette can now be effected by the internal transport device of the recorder module. By means of the motor 361, the pressure rollers 342 and 343 are lifted off the cassette changer. The power supply to the solenoid 201 is switched off and the rollers 195 are pressed against the top of the cassette by the pressure springs 199. The motor 198 of the recorder module is switched on and the cassette is conveyed over the rollers 191 in the bottom plate 132 into an end position, which is detected by the end switches 205, 206, 207. When the end position of the cassette is reached, this also provides a signal for the control computer of the external transport device. Via the external computer, said control computer acknowledges that the cassette changer is allowed to move again.

In the recorder module, the motor 215 is now energized, so that the sliding plates 221 are slid out of their position shown in FIG. 11. The traversing mechanism 212 is lowered and the optical disc is centered by the disc hold-down device 210. Then the two plates 130 and 132 also begin to move downward, so that the cassette bodily moves in the direction of the turntable 151. At a certain instant, the rollers 136 of the top plate 132 reach the stop 227, after which the top plate can no longer move further downwards. The pins 145 of the top plate 132 now retain the upper cover of the cassette, while the lower cover is moved further downward by the pins 146 as a result of the continuing movement of the bottom plate 133, so that the two cassette covers are moved apart against the force of the resilient connecting members 122 of the cassette. The optical disc reaches the turntable 151 and is centered thereon and retained by the disc hold-down device 210. The bottom plate 133 moves slightly further, so that the lower cover of the cassette no longer makes contact with the optical disc. The end position of the slide plates 221 is signalled by one of the switches 231 and 232, after which the motor 215 is switched off. Before the guide rollers 136 have reached the stops 227, the covers of the cassette are pressed towards the switches 205-207 by the end 228 of the spring 229. In the end position, the cassette covers are separated from each other by the element 231 on the rod 218. Closing elements, if any, for the slot 208 of the cassette are opened by the bracket 209 before the switches 205 and 207 are changed over.

The optical pick-up 155 can now focus the laser beam on the optical disc, which is freely rotatable inside the cassette by the motor 149, through the slot 208. The actuating device 154 moves the pick-up 155 to a position on the optical disc which is derived from the address data received from the external computer by the control computer of the recorder module. The desired data is now, for example, read and electronically processed in order to be applied to suitable output units, such as a display terminal, an external buffer memory, a facsimile apparatus, or a printer. Obviously, it is alternatively possible to record data onto the optical disc instead of reading data present on the optical disc.

While in the recorder module an optical disc is located on the turntable and data is being read or recorded, the external transport device moves the cassette changer to a different storage module in order to fetch the next cassette. The cassette is transferred from the storage module to the cassette changer in the manner described in the foregoing and the cassette changer is returned to the recorder module. When it is assumed that the new cassette is again located in the compartment 307 of the cassette changer, the cassette changer is positioned in such a way in front of the recorder module that the empty compartment 308 of the changer is disposed opposite the port of the recorder. Upon termination of the read or write operation, the internal transport device of the recorder module performs the previously described transport operations in the reverse sequence, so that the drive rollers move the cassette out of the recorder module through the port 27 via the guide slots 148 into a transfer position in which the cassette is located underneath the pressure rollers 340 and 341 of the cassette changer and above the track chains 326 and 328. The solenoid 201 is energized and the pressure rollers 195 are lifted off the upper cassette cover. The pressure rollers 340 and 341 of the cassette changer are swung down and the cassette can be pulled into the cassette changer by the track chains 326 and 328. The end position of the cassette is detected by the two switches 375 and 376.

Subsequently, the cassette changer is moved over a small distance in the vertical direction by the control computer of the transport device in such a way that the cassette which is now in the compartment 307 is located in front of the port of the recorder module and thus in front of the guide slots 148. This cassette can now be inserted into the recorder module, where it is taken over by the internal transport device of the recorder module. Thus, the cassettes at the back of the recorder module are rapidly interchanged and no time is lost in returning the cassette just taken from the recorder module and in fetching a new cassette to be sent to the recorder module.

In the foregoing, the operation of a data storage system in accordance with the invention has been explained by means of a single example. It is alternatively possible to employ a plurality of recorder modules in a data storage system, so that the cassette changer is to be moved by the external transport device between a plurality of storage modules and a plurality of recorder modules. Furthermore, it is alternatively possible in the case of larger data-storage systems in accordance with the invention to divide the external transport device into a plurality of sections each with a separate cassette changer.

If a cassette is to be manually placed into or removed from a storage module, the control computer of the storage module ensures that no undesired situations can arise. The internal transport device of the relevant storage module is moved to the front of the storage module under command of its control computer, the sensing arm 75 being swung up by the run-on cam 93. By means of the solenoid 105 the blocking element 104 is released, so that a cassette can be inserted through an opening 26. In the meantime, the gripping device 34 has been moved to a horizontal position. The cassette, guided by the guide rollers 101 and 102, can be inserted between the rings 53 of the gripping device. Insertion of the cassette should be continued until the switches 86 and 87 have detected the end position and the correct position of the cassette. At this instant, the gripping device is closed and the cassette can be moved inwards by the translation device 35. By means of the solenoid 105, the blocking element 104 is again set to its blocked position. In the case of manual removal of a cassette from the storage module the operations proceed in the reverse sequence. In general, it will be desirable that the storage modules are provided with separate control panels, so that a manual control mode of the storage module is possible. Such control panels are not present in the data storage system shown in the drawing, but may be added if desired.

What is claimed is:

1. A modular data storage system for a plurality of data carriers each having an elongate data carriable side, in which side data is recordable, and from which side data is readable, which system comprises:
    a recorder apparatus including first means for supporting a data carrier in a recorder operating position, the recorder apparatus also including means for recording and/or reading data on or from a data carrier located in the recorder operating position;
    a storage module for storing a plurality of data carriers in storage positions at which the data carriers are arranged adjacent one another, the storage module including a module frame and second means for supporting a plurality of data carriers in the frame, the storage module also including an internal transport device, accommodated within the storage module frame, for transporting a data carrier between the storage positon within the storage module and a first transfer position at a back of the storage module;
    an external transport device, cooperatively associated with the back of the storage module, for transporting a data carrier between the first transfer position and a loading position near the recorder apparatus;
    an enclosure for the external transport device, the enclosure being located at the back of the storage module, and
    an electronic control unit, associated with the storage module, for coordinating and controlling the transport of a data carrier between the storage position in the storage module and the loading position near the recorder apparatus, characterized in that.
    the recorder apparatus includes a recorder module having a module frame, the recorder module frame and the storage module frame have substantially equal outer dimension so that the modules are arrangeable substantially adjacent one another, the loading position of a data carrier is located at a back of the recorder module, the external transport device is cooperatively associated with the back of the recorder module, the enclosure for the external transport device is located at the back of the recorder module, and the recorder module further includes an internal transport device, disposed within the recorder module frame, for transporting a data carrier between the loading position at the back of the recorder module and the recorder operating position inside the recorder module.

2. A modular data storage system as claimed in claim 1, characterized in that the electronic control unit comprises a control module electronically associated with the storage module, the control module including a module frame having outer dimensions substantially equal to the outer dimensions of the storage module frame so that the control module is arrangeable substantially adjacent the storage module.

3. A system as claimed in claim 2, characterized in that the system further comprises
    a mounting rack wherein each module is arranged, and
    means for permitting quided movement of each module frame relative to the rack, between an operating position inside the rack and a maintenance position at least partly outside the rack.

4. A system as claimed in claim 1, wherein the storage module further includes a wall disposed at a front which is located opposite the back of the storage module, the wall being connected to the storage module frame, characterized in that
    the front wall has a port formed therein, the port being dimensioned such that a data carrier is insertable into and removable from the storage module through the port, and that
    the storage module also includes means for signalling the presence of a data carrier in the port, the port being located at a second transfer position at the front of the storage module.

5. A system as claimed in claim 4, characterized in that the storage module further includes means for blocking the port.

6. A system as claimed in claim 4, wherein the second supporting means includes a storage rack disposed within the storage module frame, the storage rack having slots for arranging a data carrier vertically in the storage position so that the elongate data
    carriable side of the data carrier is oriented generally parallel to the front wall of the storage module; and wherein
    the storage module has an internal width which is greater than twice the width of a data carrier so that an internal transport space is formed adjacent the storage rack, the space having a width greater than the width of a data carrier, characterized in that
    the internal transport device of the storage module further includes: means for sliding a data carrier in a direction parallel to the front wall of the storage module into and out of the storage rack, between the storage position and a slid-out position with the transport space; means for gripping a data carrier disposed in the transport space; translational means, connected to the sliding means and to the gripping means, for transporting a gripped data carrier between the slid-out position and the first transfer position 1, and bi-directional means, connected to the gripping means and to the translational means, for tilting a data carrier in the transport space through 90° in a first direction or through 90° in an opposite second direction so that a gripped data carrier is transportable to the first transfer position in a first or in a second tilted horizontal orientation at which the elongate data carriable side is oriented generally transverse of the front wall.

7. A modular data storage system for a plurality of data carriers each having an elongate data carriable side, in which side data is recordable, and from which side data is readable, which system comprises:

a recorder apparatus including first means for supporting a data carrier in a recorder operating position, the recorder apparatus also including means for recording and/or reading data on or from a data carrier located in the recorder operating position;

a storage module for storing a plurality of data carriers in storage positions at which the carriers are arranged adjacent one another, the storage module including;

a front, a back located opposite the front, a wall disposed at the front, a module frame to which the front wall is connected, an internal transport device, accommodated within the storage module frame, for trasporting a data carrier between the storage position within the storage module and a first transfer position at the back of the storage module, and second means for supporting a plurality of data carriers in the frame, the second supporting means including a storage rack having slots for arranging a data carrier vertically in the storage position so that the elongate data carriable side of the data carrier is oriented generally parallel to the front wall of the storage module, the storage module also including an internal width which is greater than twice the width of a data carrier so that an internal transport space is formed adjacent the storage rack, the space having a width greater than the width of a data carrier;

an external transport device, cooperatively associated with the back of the storage module, for transporting a data carrier between the first transfer position and a loading position near the recorder apparatus;

an enclosure for the external transport device, the enclosure being located at the back of the storage module, and an electronic control unit, associated with the storage module, for coordinating and controlling the transport of a data carrier between the storage positon in the storage module and the loading position near the reorder apparatus, characterized in that:

the front wall of the storage module has a port formed therein, the port being dimensioned such that a data carrier is insertable into and removable from the storage module through the port;

the storage module includes means for signalling the presence of a data carrier in the port, the port being located at a second transfer positon at the front of the storage module;

the recorder apparatus includes a recorder module having a module frame, the recorder and the storage module frames each having substantially equal outer dimensions;

the loading position of a data carrier is located at a back of the recorder module;

the external transport device is cooperatively associated with the recorder module;

the enclosure for the external transport device is located at the back of the recorder module;

the recorder module also includes an internal transport device disposed within the recoreder module frame, for transporting a data carrier between the loading position at the back of the recorder module and the recorder operating position inside the recorder module;

the internal transport device of the storage module also includes: means for sliding a data carrier in a direction parallel to the front wall of the storage module into and out of the storage rack, between the storage position and a slid-out position within the storage space; means for gripping a data carrier disposed in the storage space; translational means, connected to the sliding means and to the gripping means, for transporting a gripped data carrier between the slid-out position and the first transport position; bi-directional means, connected to the gripping means and to the translational means, for tilting a data carrier in the transport space through 90° in a first direction or through 90° in an opposite second direction so that a gripped data carrier is transportable to the first transfer position in a first or in a second tilted horizontal orientation at which the elongate data carriable side is oriented generally transverse of the front wall, and the translational means has an internal transport carriage on which the bi-directional means is located, the translational means also has a substantially L-shaped sensing arm arranged on the carriage, the sensing arm includes a first and a second limb, the first limb is connected to the carriage and extends toward the front wall of the storage module, the first limb has an end remote from the carriage, the second limb is connected to the remote end of the first limb and extends in a directin transverse of tha first limb, the translational means further has means, disposed on the second limb, for signalling the first and the second tilted horizontal orientation of a gripped data carrier.

* * * * *